(12) United States Patent
Yoshinobu et al.

(10) Patent No.: US 7,871,322 B2
(45) Date of Patent: Jan. 18, 2011

(54) GAME PROGRAM AND GAME DEVICE

(75) Inventors: Tomoaki Yoshinobu, Kyoto (JP);
Toshikazu Kiuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 648 days.

(21) Appl. No.: 11/418,186

(22) Filed: May 5, 2006

(65) Prior Publication Data

US 2006/0287029 A1    Dec. 21, 2006

(30) Foreign Application Priority Data

Jun. 15, 2005    (JP)    ............................... 2005-174966

(51) Int. Cl.
*A63F 9/24*    (2006.01)
*A63F 13/00*   (2006.01)
*G06F 17/00*   (2006.01)
*G06F 19/00*   (2006.01)

(52) U.S. Cl. ............................... 463/9; 364/410; 273/1; 273/138; 463/10; 463/42; 434/336; 434/327; 434/350; 434/352

(58) Field of Classification Search ...................... 463/9
See application file for complete search history.

(56) References Cited

U.S. PATENT DOCUMENTS

| | | | | |
|---|---|---|---|---|
| 3,911,596 A | * | 10/1975 | Yamauchi | .................... 434/350 |
| 4,375,666 A | * | 3/1983 | Buck et al. | ..................... 463/10 |
| 4,764,120 A | * | 8/1988 | Griffin et al. | ................. 434/336 |
| 4,767,335 A | * | 8/1988 | Curt | ............................ 434/352 |
| 5,034,807 A | * | 7/1991 | Von Kohorn | .................... 725/5 |
| 5,092,779 A | * | 3/1992 | Piwonka et al. | ............. 434/352 |
| 6,758,754 B1 | * | 7/2004 | Lavanchy et al. | .............. 463/42 |
| 2002/0016196 A1 | * | 2/2002 | Orak | .............................. 463/9 |
| 2002/0102522 A1 | * | 8/2002 | Sugimoto | .................... 434/322 |
| 2002/0132656 A1 | * | 9/2002 | Lydon et al. | .................... 463/9 |

FOREIGN PATENT DOCUMENTS

| | | |
|---|---|---|
| JP | 2001-16250 | 6/2001 |
| JP | 2004-242816 | 9/2004 |

* cited by examiner

*Primary Examiner*—Paul A. D'Agostino
(74) *Attorney, Agent, or Firm*—Nixon & Vanderhye P.C.

(57) ABSTRACT

A game device provides a question to a plurality of players. The game device counts the number of players each having provided an answer to the question or each having provided a correct answer to the question. When the counted number of players reaches a predetermined number of players, a predetermined time limit is set. The game device measures an elapsed time from when the time limit has been set (i.e., a correct answer elapsed time), and stops accepting an answer to the question when the correct answer elapsed time reaches the time limit.

25 Claims, 20 Drawing Sheets

GAME PROGRAM AND GAME DEVICE

CROSS REFERENCE OF RELATED APPLICATION

The disclosure of Japanese Patent Application No. 2005-174966 is incorporated herein by reference.

BACKGROUND

1. Field of the Technology

The present invention relates to a game program and a game device, and particularly to a game program and a game device for executing a quiz game in which a plurality of players participate.

2. Description of the Background Art

There have been techniques related to a quiz game in which a plurality of players participate and answer quiz questions (refer to, e.g., Japanese Laid-Open Patent Publication 2004-242816, hereinafter referred to as a patent document 1; and Japanese Laid-Open Patent Publication 2001-162050, hereinafter referred to as a patent document 2). The patent document 1 discloses a game device for executing a quiz game in which a plurality of players participate and answer quiz questions. The game device is capable of placing the plurality of players in order of superiority, the plurality of players each having correctly answered a same number of questions. The game device calculates a correct answer rate of each player and an average length of time consumed from when a question is given until said player gives an answer, and then the game device gives a ranking to said player based on a result of the calculation. Thus, the plurality of players each having correctly answered the same number of questions are given rankings in a fair manner.

The game device disclosed in the patent document 1 does not set a time limit for players to answer a question. This allows each player to figure out a correct answer for an unlimited period of time without answering. For this reason, a player who has answered a question first is required to wait for all the other players to answer the question. Such a waiting time makes the player having answered the question first very bored. Further, there may be a case where all players are not allowed to advance to a next question since one of the players has not answered a question. In such a case, players each having already answered the question are required to wait for the player to answer the question. This may cause the waiting players to feel that the game is boring. Thus, in the case where a time limit is not set, there is a possibility that the players become bored since the game does not run smoothly.

Therefore, it is considered as useful to set a time limit for a quiz game in which a plurality of players participate. For example, the patent document 2 discloses a game device which sets a predetermined time limit for the players. Since the game device sets the predetermined time limit for each question, questions are given smoothly one after another. Even if there exists a player who takes a long time to answer a question, a next question is given when the predetermined time limit expires. This runs the game smoothly. Such a game device is useful to be used as a commercial arcade game which requires a high customer-turnover rate (i.e., player-turnover rate).

In the above-described patent document 2, since a fixed length of time is predetermined as the time limit, the length of the time limit may not be appropriate for some questions. In other words, there may be a case where the time limit is too long or too short for the players. Hereinafter, such a case is described.

Usually in a quiz game, questions given during the game vary in type and difficulty level. Accordingly, the time limit is required to be set to an appropriate length of time in accordance with the difficulty of each question. Here, the difficulty level of a question depends on a player answering the question. For example, in the case where a predetermined time limit (e.g., 10 seconds) is set for a question, if the players are children, the difficulty level of the question becomes relatively high, and the players may feel that the time limit is too short. In such a case, there is a possibility that all the players cannot answer the question within the time limit, and lose interests in the game. On the other hand, if the players are adults, the difficulty level of the question becomes relatively low, and the players may feel that the time limit is too long. In such a case, there is a possibility that all the players find time on their hands, and become bored.

As described above, in a conventional manner in which a time limit having a fixed time length is set for each question, a time limit having an appropriate time length for the players is not set since a skill level of the players is not taken into account. Further, when a game creator creates a game, the game creator is required to set an appropriate time limit for each question by taking a difficulty level of each question into account. Such a process for setting the appropriate time limit for each question is burdensome for the game creator.

SUMMARY

Therefore, a feature of an example embodiment presented herein is to provide a game program and a game device which are capable of, for a game in which a plurality of players are required to perform tasks (e.g., answer questions), setting in a simple manner an appropriate time limit for each task (question).

The example embodiment presented herein has the following features to achieve the above. Note that reference numerals and the like indicated between parentheses are merely provided to facilitate the understanding of the example embodiment, and are not of any limitative nature.

A first aspect of the example embodiment is directed to a game program for causing a computer (e.g., CPU core 21) of a game device (10) to execute a quiz game in which a plurality of players participate. The game program causes the computer to perform a question providing step (S12), a player number counting step (S46), a time limit setting step (S18 and S19), a time measuring step (S19) and a terminating step (S20). At the question providing step, the computer provides a question to the plurality of players; at the player number counting step, the computer counts the number of players each having provided an answer to the question or each having provided a correct answer to the question; at the time limit setting step, the computer sets a predetermined time limit when the counted number of players has reached a predetermined number of players; at the time measuring step, the computer measures an elapsed time from when the time limit has been set (i.e., a "correct answer elapsed time"); and at the terminating step, the computer terminates an acceptance of an answer to the question when the elapsed time has reached the time limit.

In a second aspect of the example embodiment, the game program may further cause the computer to perform a remaining time obtaining step (S17 or S19) and an addition step (S43 and S44). At the remaining time obtaining step, the computer obtains, for a player having provided a correct answer to the question after a start of measuring the elapsed time, a remaining time by subtracting the elapsed time from the time limit, the elapsed time having been measured until the player has provided the correct answer. At the addition step, the computer adds a predetermined number of points (10 points) to the number of points of a player who has provided, before the start of measuring the elapsed time, a correct answer to the question, and, based on the remaining time, the computer adds the number of points, which is less than the predetermined number of points, to the number of points of the player having provided the correct answer after the start of measuring the elapsed time.

A third aspect of the example embodiment is a game program for causing a computer of a game device to execute a quiz game in which a plurality of players participate. The game program causes the computer to perform a question providing step (S12), a first time measuring step (S94), a player number counting step (S46), a time limit setting step (S18, S19 and S95), a second time measuring step (S19) and a terminating step (S20). At the question providing step, the computer provides a question to the plurality of players; at the first time measuring step, the computer measures a first elapsed time (i.e., a "given question elapsed time") which is an elapsed time from when the question has been provided; at the player number counting step, the computer counts the number of players each having provided an answer to the question or each having provided a correct answer to the question; at the time limit setting step, the computer sets a predetermined time limit when the counted number of players has reached a predetermined number of players, or when the first elapsed time has reached a predetermined length of time; at the second time measuring step, the computer measures a second elapsed time (i.e., a "correct answer elapsed time") which is an elapsed time from when the time limit has been set; and at the terminating step, the computer terminates an acceptance of an answer when the second elapsed time has reached the time limit.

In a fourth aspect of the example embodiment, the game program may further cause the computer to perform a remaining time obtaining step (S17 or S19) and an addition step (S43 and S44). At the remaining time obtaining step, the computer obtains, for a player having provided a correct answer to the question after a start of measuring the second elapsed time, a remaining time by subtracting the second elapsed time from the time limit, the second elapsed time having been measured until the player has provided the correct answer; at the addition step, the computer adds a predetermined number of points to the number of points of a player who has provided, before the start of measuring the second elapsed time, a correct answer to the question, and, based on the remaining time, adding the number of points, which is less than the predetermined number of points, to the number of points of the player having provided the correct answer after the start of measuring the second elapsed time.

In a fifth aspect of the example embodiment, the game program may further cause the computer to perform a calculation step and an addition step. At the calculation step, the computer calculates an order in which the players each have provided a correct answer to the question. At the addition step, the computer adds, in accordance with the order, the number of points to each of numbers of points of the players each having provided the correct answer.

In a sixth aspect of the example embodiment, the game program may further cause the computer to perform an answer result storing step (S93). At the answer result storing step, after the acceptance of an answer is terminated at the terminating step, the computer stores answer result data (65) indicating information about a result of an answer provided by at least one of the plurality of players. After the acceptance of an answer is terminated at the terminating step, the computer performs the question providing step again to provide a next question. At the time limit setting step, the computer sets a length of a time limit for the next question based on a content of the answer result data.

In a seventh aspect of the example embodiment, the answer result data contains data indicating at least either information about the number of players each having provided a correct answer to the question or information about a length of time from when the question is provided until each of the plurality of players has provided an answer to the question.

In an eighth aspect of the example embodiment, a virtual player whose answering is controlled by the computer may be included among the plurality of players. In such a case, the game program further causes the computer to perform a player data obtaining step and a control step (S72). At the player data obtaining step, before the question is provided, the computer obtains player data (61) indicating an attribute of a manner in which the virtual player answers the question. At the control step, the computer controls answering of the virtual player in accordance with the feature indicated by the player data.

In a ninth aspect of the example embodiment, the player data may contain correct answer rate data (62) indicating a correct answer rate of the virtual player for the question, and answering time data (63) indicating a length of time from when the question is provided until the virtual player provides an answer. In such a case, at the control step, the computer determines, in accordance with the correct answer rate data, whether the answer to be provided by the virtual player is correct, and determines, in accordance with the answering time data, a length of time from when the question is provided until the virtual player provides the answer.

In a tenth aspect of the example embodiment, the game program may further cause the computer to perform a history recording step (S91 and S92). At the history recording step, the computer records history data indicating a history of results of answers provided by at least one of the plurality of players. In such a case, at the control step, the history data previously recorded at the history recording step is used as the player data.

In an eleventh aspect, at the history recording step, at least correct answer rate data indicating a correct answer rate of the at least one player and answering time data indicating a length of time from when a question is provided until the at least one player provides an answer are recorded as the history data.

A twelfth aspect of the example embodiment is directed to a game program for causing a computer (e.g., CPU core 21) of a game device (10) to execute a game in which a plurality of players perform tasks. The game program causes the computer to perform a task providing step (S12), a player number counting step (S46), a time limit setting step (S18 and S19), a time measuring step (S19) and a terminating step (S20). At the task providing step, the computer provides a task to the plurality of players; at the player number counting step, the computer counts the number of players each having finished the task; at the time limit setting step, the computer sets a predetermined time limit when the counted number of players has reached a predetermined number of players; at the time measuring step, the computer measures an elapsed time from when the time limit has been set; and at the terminating step, when the elapsed time has reached the time limit, the computer terminates an acceptance of an input which each player provides to perform the task.

A thirteenth aspect of the example embodiment is a game program for causing a computer of a game device to execute a game in which a plurality of players perform tasks. The game program causes the computer to perform a task providing step (S12), a first time measuring step (S94), a player number counting step (S46), a time limit setting step (S18, S19 and S95), a second time measuring step (S19) and a terminating step (S20). At the task providing step, the computer provides a task to the plurality of players; at the first time measuring step, the computer measures a first elapsed time which is an elapsed time from when the task has been provided; at the player number counting step, the computer counts the number of players each having finished the provided task; at the time limit setting step, the computer sets a predetermined time limit when the counted number of players has reached a predetermined number of players, or when the first elapsed time has reached a predetermined length of time; at the second time measuring step, the computer measures a second elapsed time which is an elapsed time from when the time limit has been set; and at the terminating step, when the second elapsed time has reached the time limit, the computer terminates an acceptance of an input which each player provides to perform the task.

The example embodiment may be provided in the form of a game device having same functions as those realized by performing the above-described game program.

According to the first aspect, the time limit is set when the number of players each having provided a correct answer to a question or the number of players each having provided an answer to the question reaches a predetermined number of players. By counting the number of players each having provided a correct answer or the number of players each having provided an answer, an actual skill level of the players is recognized, and the time limit is set in accordance with the actual skill level of the players. Since the time limit is set in accordance with the actual skill level of the players, a length of time during which each player is allowed to answer a question does not become too long or too short. In other words, the length of time during which each player is allowed to answer a question is set appropriately. Thus, according to the first aspect, the time limit having a time length which suits the skill level of the players is set in a simple manner. Further, since there is no necessity to set a time limit to each question separately, a burden for a game creator is reduced.

According to the second aspect, an appropriate number of points is given to each player who has answered a question correctly.

Similarly to the first aspect, according to the third aspect, the time limit is set in accordance with the actual skill level of the players. Since the time limit is set in accordance with the actual skill level of the players, a length of time during which each player is allowed to answer a question does not become too long or too short. Thus, the length of time during which each player is allowed to answer a question is set appropriately. Further, according to the third aspect, even in the case where no player answers a question because, e.g., the question is too difficult, the time limit is set when the first elapsed time reaches a predetermined length of time. This prevents an occurrence of a situation in which a question does not end since no player answers a provided question. Consequently, the players are kept from being tired of figuring out a correct answer to a question when no player can answer the question, and a game runs smoothly.

Similarly to the second aspect, according to the fourth aspect, an appropriate number of points is given to each player who has answered a question correctly.

Similarly to the second and fourth aspects, according to the fifth aspect, an appropriate number of points is given to each player who has answered a question correctly.

According to the sixth aspect, the length of time limit may be changed based on a result of an answer provided to a previous question by at least one of the plurality of players. This allows the length of time limit to be set appropriately, and thus the players are given an appropriate length of time to answer a question.

According to the seventh aspect, whether or not the length of time limit is appropriate for the players is accurately determined by using, as answer result data, information about the number of players each having answered a question correctly and the length of time from when the question is provided until each of the plurality of players has provided an answer to the question. For example, if the number of players each having answered the question correctly is small, it is determined that the time limit is too short for the players. If the length of time from when the question is provided until each of the plurality of players has provided an answer is relatively short, it is determined that the time limit is too long for the players. By using such information as the answer result data, the time limit having an appropriate time length is set.

According to the eighth aspect, even if an actual number of players playing the game is small, the players can enjoy a quiz game in which a large number of players participate.

According to the ninth aspect, virtual players each having various characteristics may participate in the quiz game. For example, one virtual player may tend to take a long time to answer a question although having a high correct answer rate, and the other virtual player may tend to answer a question quickly although having a low correct answer rate.

According to the tenth aspect, the virtual player participating in the quiz game may have characteristics of any player. Even if a particular player does not participate in the quiz game, players participating in the quiz game can play the game with the particular player virtually, by using a virtual player having the characteristics of the particular player.

According to the eleventh aspect, the virtual player is allowed to have the characteristics of any player by using, as the player data, history data indicating the correct answer rate of said any player and the length of time from when a question is provided until said any player provides an answer.

According to the twelfth aspect, a same effect as that provided by the first aspect can be provided not only for a quiz game but also for any other game in which a plurality of players are required to perform various tasks. To be specific, a time limit having a time length which suits the skill level of the players is set in a simple manner. Further, since there is no necessity to set a time limit to each question separately, a burden for a game creator is reduced.

According to the thirteenth aspect, a same effect as that provided by the third aspect can be provided not only for a quiz game but also for any other game in which a plurality of players are required to perform various tasks. To be specific, a time limit having a time length which suits the skill level of the players is set in a simple manner. Further, the players are not required to keep on attempting a same task repeatedly in the case where any one of the players cannot finish the task. This keeps the players from becoming tired of performing the same task repeatedly, and runs the game smoothly.

These and other features, aspects and advantages of the example embodiment presented herein will become more apparent from the following detailed description when taken in conjunction with the accompanying drawings.

DESCRIPTION OF THE PREFERRED EMBODIMENTS

First Embodiment

Figure 1:
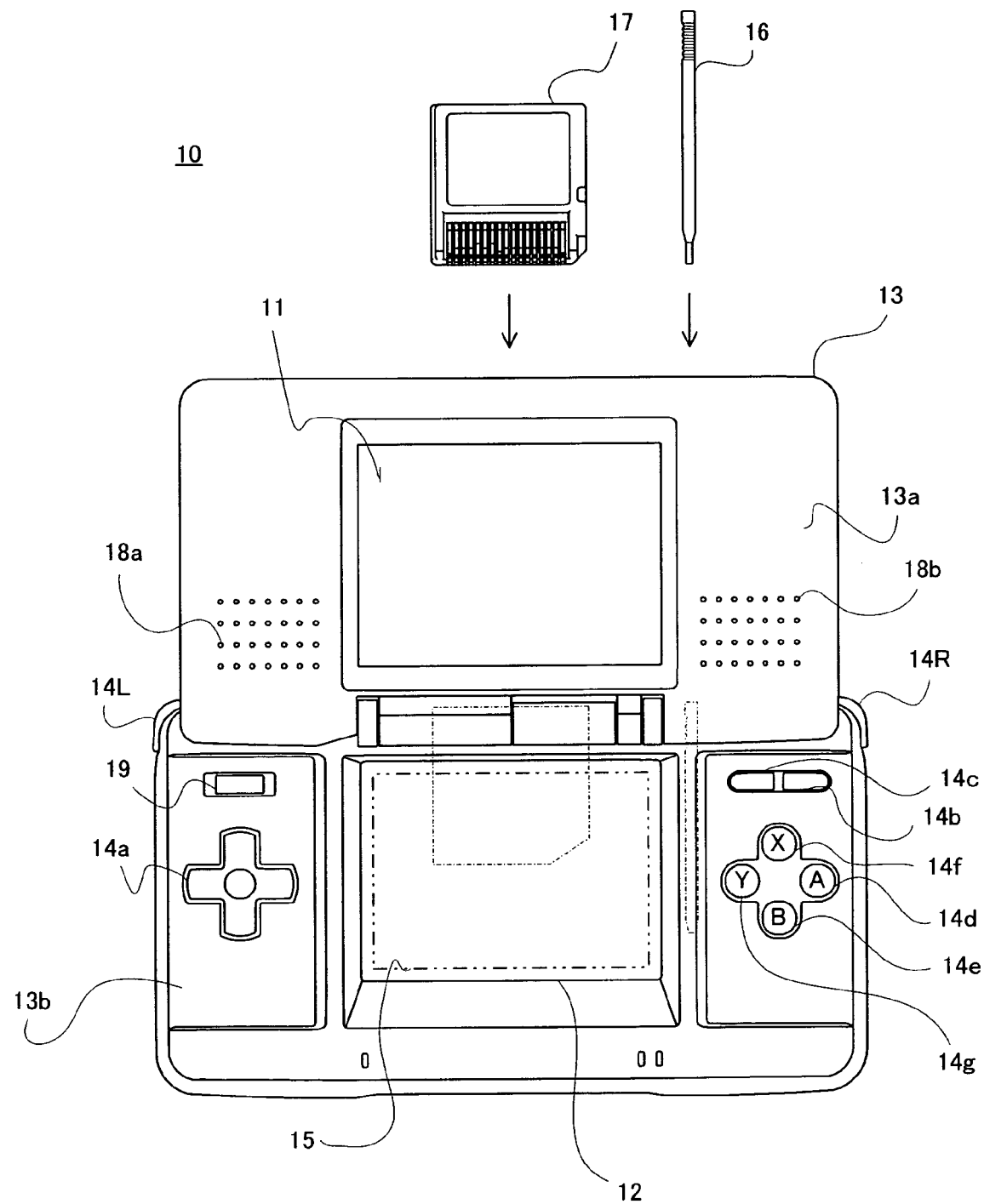
FIG. 1 is an external view of a game device according to an embodiment.

A setting and a movement of a game device according to a first embodiment will be described below. FIG. 1 is an external view of a game device according to a first embodiment of the present invention. In FIG. 1, a game device 10 includes a first LCD (Liquid Crystal Display) 11 and a second LCD 12. A housing 13 comprises an upper housing 13a and a lower housing 13b, and the first LCD 11 is accommodated in the upper housing 13a, and the second LCD 12 is accommodated in the lower housing 13b. Resolutions of the first LCD 11 and the second LCD 12 are both 256 dots×192 dots. Note that though a LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 2) to an exterior. A description of the pair of loudspeakers will be provided later.

The lower housing 13b is provided with input devices as follows; a cross switch 14a, a start switch 14b, a select switch 14c, a "A" button 14d, a "B" button 14e, a "X" button 14f, a "Y" button 14g, a "L" button 14L, and a "R" button 14R. In addition, a touch panel 15 is provided on a screen of the second LCD 12 as another input device. The lower housing 13b further includes a power switch 19, and insertion openings for storing a memory card 17 and a stick 16.

The touch panel 15 may be of any type such as a resistive film type, an optical type (infrared type), or a capacitive coupling type. The touch panel 15 has a function of outputting, when its surface is touched with the stick 16, coordinate data which corresponds to a touch position. Though the following description is provided on an assumption that the player uses a stick 16 to operate the touch panel 15, of course the touch panel 15 may also be operated by a pen (stylus pen) or a finger instead of the stick 16. In the present embodiment, a touch panel 15 having a resolution at 256 dots×192 dots (detection accuracy) as same as the second LCD 12 is used. However, resolutions of the touch panel 15 and the second LCD 12 may not necessarily be consistent with each other.

The memory card 17 is a storage medium having a game program stored therein, and placed in the insertion slot provided at the lower housing 13b in a removable manner.

Figure 2:
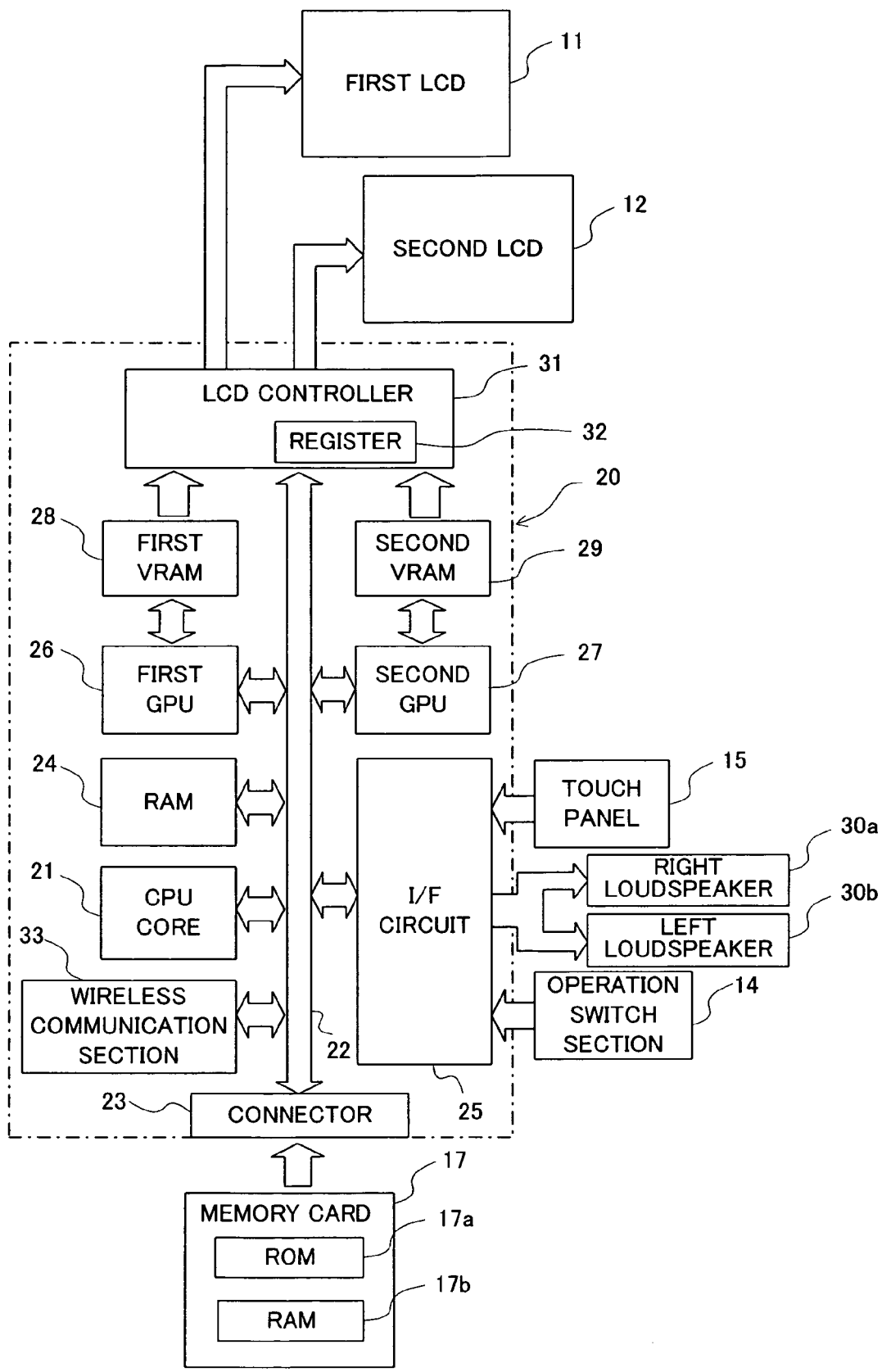
FIG. 2 is an internal configuration of the game device.

Next, an internal setting of the game device 10 will be described with reference to FIG. 2. In FIG. 2, a CPU core 21 is mounted on an electronic circuit board 20 which is to be housed in the housing 13. Via a bus 22, the CPU core 21 is connected to a connector 23, an input/output interface circuit (shown as I/F circuit in the diagram) 25, a first GPU (Graphics Processing Unit) 26, a second GPU 27, a RAM 24, a LCD controller 31 and a wireless communication section 33. The memory card 17 is connected to the connector 23 in a removable manner. The memory card 17 includes a ROM 17a for storing a game program and a RAM 17b for storing backup data in a rewritable manner. The game program stored in the ROM 17a of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. To the I/F circuit 25 are connected, a touch panel 15, a right loudspeaker 30a, a left loudspeaker 30b and an operation switch section 14, which is comprised of a cross switch 14a, a "A" button 14d, and others, as shown in FIG. 1. The right loudspeaker 30a and the left loudspeaker 30b are arranged inside the sound holes 18a and 18b, respectively.

A first VRAM (Video RAM) 28 is connected to the first GPU 26, and a second VRAM 29 is connected to the second GPU 27. In accordance with an instruction from the CPU core 21, the first GPU 26 generates a first game image based on data used for image generation which is stored in the RAM 24, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the first VRAM 28, and outputs to the second LCD 12 the second game image which has been written into the second VRAM 29. When the value of the register 32 is 1, the first game image which has been written into the first VRAM 28 is outputted to the LCD 12, and the second game image which has been written into the second VRAM 29 is outputted to the first LCD 11.

The wireless communication section 33 has functions for transmitting and receiving data used for game processes and other data to and from the wireless communication section 33 of another game device. For example, the wireless communication section 33 provides a wireless communication function complying with a wireless LAN standard IEEE 802.11. The wireless communication section 33 outputs received data to the CPU core 21. Also, the wireless communication section 33 transmits, to another game device, data specified by the CPU core 21. Note that, by mounting protocols, e.g., TCP/IP protocols (Transmission Control Protocol/Internet Protocol), and a predetermined browser on the wireless communication section 33 or on a storage section inside the game device 10, the game device 10 is enabled to connect to a network such as the Internet via the wireless communication section 33. Thus, the game device 10 allows a user thereof to browse, by using the first LCD 11 and the second LCD 12, data such as documents and images published on the network, and also, the game device 10 is enabled to perform the game processes using game data published on the network.

Further, the setting of the game device 10 as mentioned above is merely an example. The present invention is applicable to any computer system which comprises at least one display device. Also, the game program of the present invention can be supplied to a computer system not only by the way of an external storage medium such as a memory card 17, but also by the way of a wired or wireless communication path. The program can also be recorded beforehand in a nonvolatile storage inside of a computer system.

Hereinafter in the first embodiment, a game played by using the game device 10 will be described. The game is a quiz game in which a plurality of players answer quiz questions. In the present embodiment, each player uses his/her own game device 10 to play the game. In other words, in the present embodiment, a game system comprises a plurality of game devices 10 corresponding to the plurality of players, respectively. While the players play the game, the game devices 10 communicate with each other. Here, the memory card 17, in which the game program according to the present embodiment is stored, may be mounted on any of the plurality of game devices 10 constituting the game system. Hereinafter, the game device 10 on which the memory card 17 is mounted is occasionally referred to as a "main device", and the other game device(s) 10 is occasionally referred to as a "subordinate device".

Next, the game is briefly described. In the present embodiment, a number of quiz questions are prepared for the game. Each question is categorized into a genre such as "perception", "language", "analysis", "mathematics" or "memory". Each genre has a plurality of mini games, and each mini game includes a set of plurality of questions of a same type. A plurality of different difficulty levels are predetermined for the set of plurality of questions. First, a player of the main device selects a genre, a type of mini game (i.e., a type of the set of plurality of questions), and a difficulty level of the set of questions. When the player has selected all of the above, each of the plurality of game devices 10 starts giving (providing) the questions. Here, a timing of giving each question is synchronized among the plurality of game devices 10. In other words, each game device 10 gives a same question at a same timing. Note that, data associated with each question is contained in the game program, and transmitted from the main device to each subordinate device at an appropriate timing.

Figure 3A:
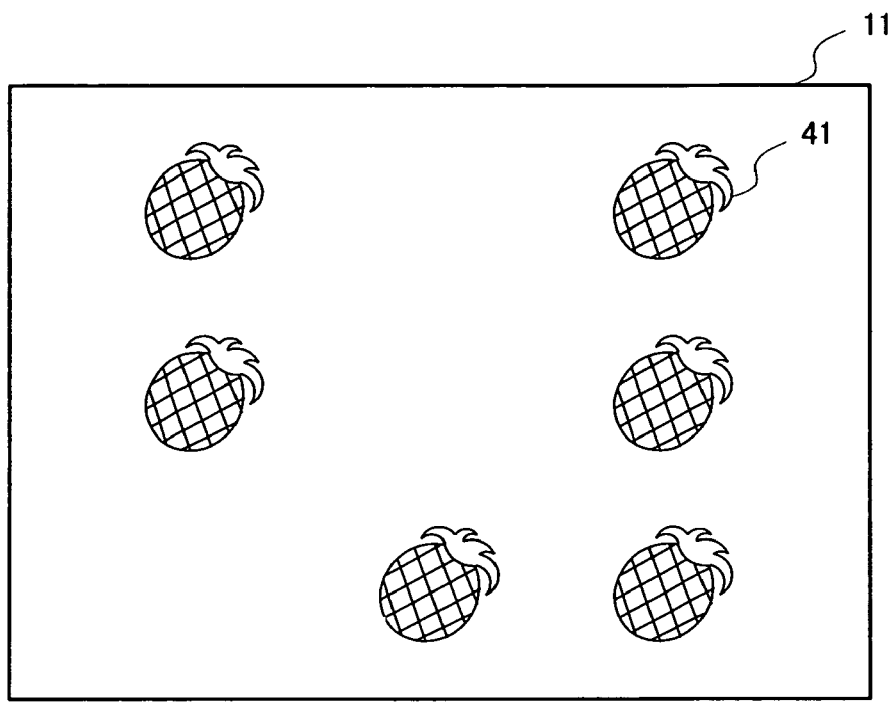
FIG. 3A shows a game image displayed when a question is given.
Figure 3B:
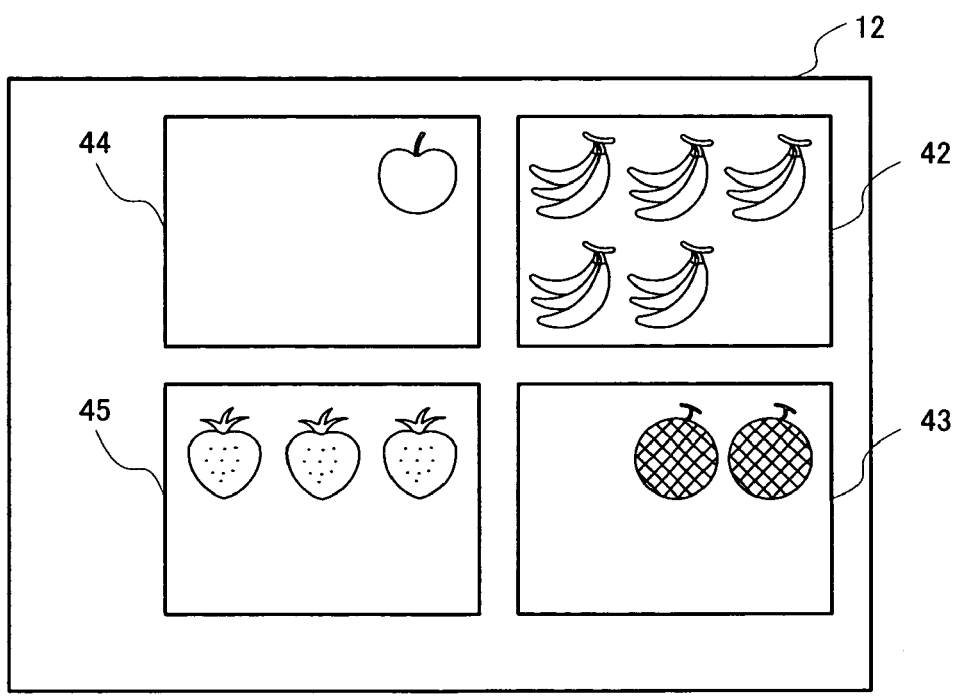
FIG. 3B shows another game image displayed when the question is given.

FIGS. 3A and 3B show game images which are displayed when the game device 10 gives a question. To be specific, FIG. 3A shows a game image which is displayed on the first LCD 11 when the question is given, and FIG. 3B shows another game image which is displayed on the second LCD 12 when the question is given. Here, a number-crunching question shown in FIGS. 3A and 3B is described as an example. The game image of FIG. 3A shows six pineapples (i.e., an image 41), and the game image of FIG. 3B shows four areas 42 to 45. Five bananas are shown in the area 42; two melons are shown in the area 43; an apple is shown in the area 44; and three strawberries are shown in the area 45. When the question as shown in FIGS. 3A and 3B is given, a player of the game device 10 is required to select two kinds of fruits (i.e., two areas) out of all the four kinds of fruits displayed on the second LCD 12, such that the total number of fruits selected by the player corresponds to the number of fruits displayed on the first LCD 11 (i.e., the number of pineapples). In the exemplary question shown in FIGS. 3A and 3B, since six pineapples are shown on the first LCD 11, a correct answer to the question is to select the area 42 in which five bananas are displayed and the area 44 in which an apple is displayed.

When the question is given and such images as shown in FIGS. 3A and 3B are displayed, the game device 10 accepts an input from the player. In the present embodiment, the player performs the input using the touch panel 15. To be specific, the player answers the question by specifying (touching), with the stick 16, a portion of a surface of the touch panel 15 (i.e., a portion of a surface of the screen of the LCD 12), the portion displaying an area to be selected. Upon receiving an answer from the player, the game device 10 determines whether or not the answer given (provided) by the player is correct. To be specific, upon receiving the input (touch input) provided by the player using the touch panel 15, the game device 10 determines, based on a position of a portion of the touch panel where the touch input has been provided, whether or not the answer given by the player is correct. Then, the game device 10 transmits, to the other game device(s) 10, information about whether or not the answer is correct. If the answer is correct, a text message or an image indicating that the answer is correct is displayed on the second LCD 12 of the game device 10 of the player having given the correct answer.

Figure 4:
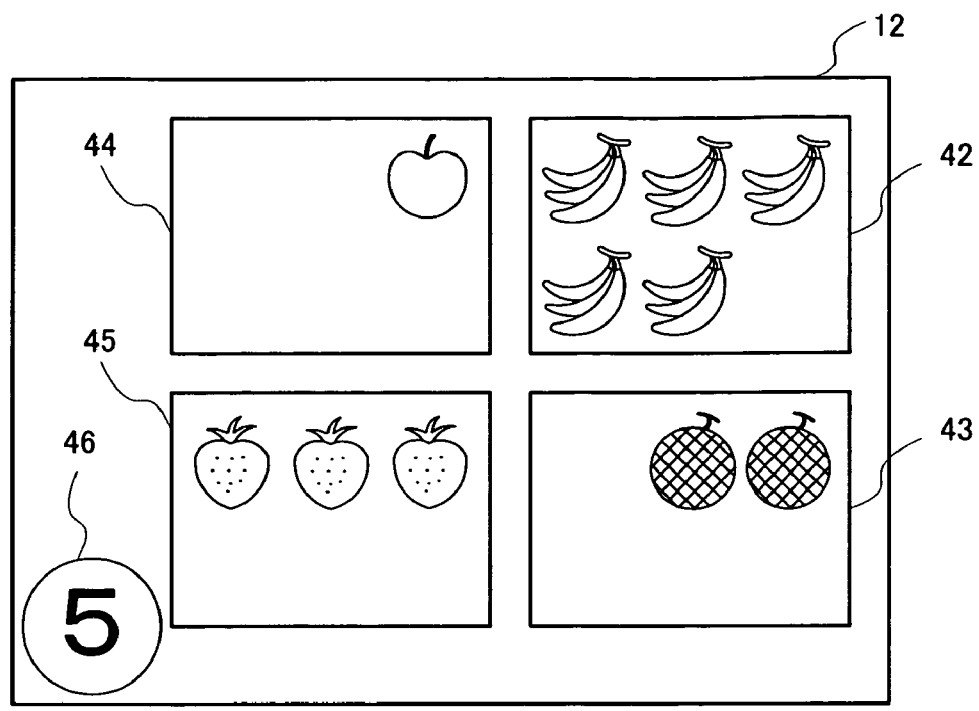
FIG. 4 shows a game image displayed when a time limit is set.

When any of the plurality of players gives (provides) a correct answer, data indicating that the player has given a correct answer is transmitted from the game device 10 of the player to the game device(s) 10 of the other player(s). Upon receiving the data, the game device(s) 10 of the other player(s) sets a time limit. In other words, the time limit is set when any of the plurality of players gives a correct answer. To be specific, from when any of the plurality of players gives a correct answer, the game device(s) 10 of the other player(s) starts measuring an elapsed time (hereinafter, referred to as a "correct answer elapsed time"), and does a countdown of seconds until the correct answer elapsed time reaches a predetermined time limit. FIG. 4 shows a game image which is displayed when the time limit has just been set. The game image shown in FIG. 4 is displayed on the second LCD 12. In FIG. 4, an image (image 46), which indicates a remaining time left before the time limit is reached, is shown at the lower left of the LCD 12. Here, the image 46 of FIG. 4 indicates that the remaining time is five seconds. Note that, in the present embodiment, the predetermined time limit is five seconds.

After the time limit is set, the other player(s) who has not answered the question is allowed to answer the question only until the correct answer elapsed time reaches the time limit. In other words, the game device(s) 10 of the other player(s) accepts a touch input provided by the other player(s) until the correct answer elapsed time reaches the time limit.

When a player gives a correct answer, the game device 10 of the player updates the number of points the player has. To be specific, in the present embodiment, 10 points are added to the number of points of a player who first gives a correct answer. Thereafter, the number of seconds of the remaining time is added as points (or a point) to the number of points of each player who gives a correct answer after the time limit has been set (i.e., each player who gives a correct answer after any player has given a correct answer). For example, if any player gives a correct answer when the remaining time is three seconds, 3 points are added to the number of points of the player.

The question ends when the correct answer elapsed time reaches the time limit, or when all the players each have given a correct answer to the question. In other words, when the correct answer elapsed time reaches the time limit, or when all the players each have given a correct answer to the question, the game device 10 gives a next question. Thereafter, the same type of questions are given until the number of points of any player reaches a predetermined number of points. In the present embodiment, the predetermined number of points is 50. Note that, when any player gives a correct answer to a question, and the number of points of the player reaches the predetermined number, the game device 10 ends the game without giving a next question. In this case, the player is a winner of the game.

As described above, in the present embodiment, the game device 10 sets the time limit when any player gives a first correct answer. By setting the time limit in such a manner, the length of the time limit is kept from being too long or too short. In other words, the length of the time limit is set appropriately. In a conventional manner in which the time limit is set in advance, the length of the time limit is not set by taking a skill level of the players into account. Also, the length of the time limit is required to be set for each question in accordance with the difficulty level thereof. On the other hand, in the present embodiment, the time limit is set such that the length of the time limit suits the skill level of the players. Further, the present embodiment reduces a burden for a game creator since the necessity of setting the length of time limit for each question is eliminated.

Figure 5:
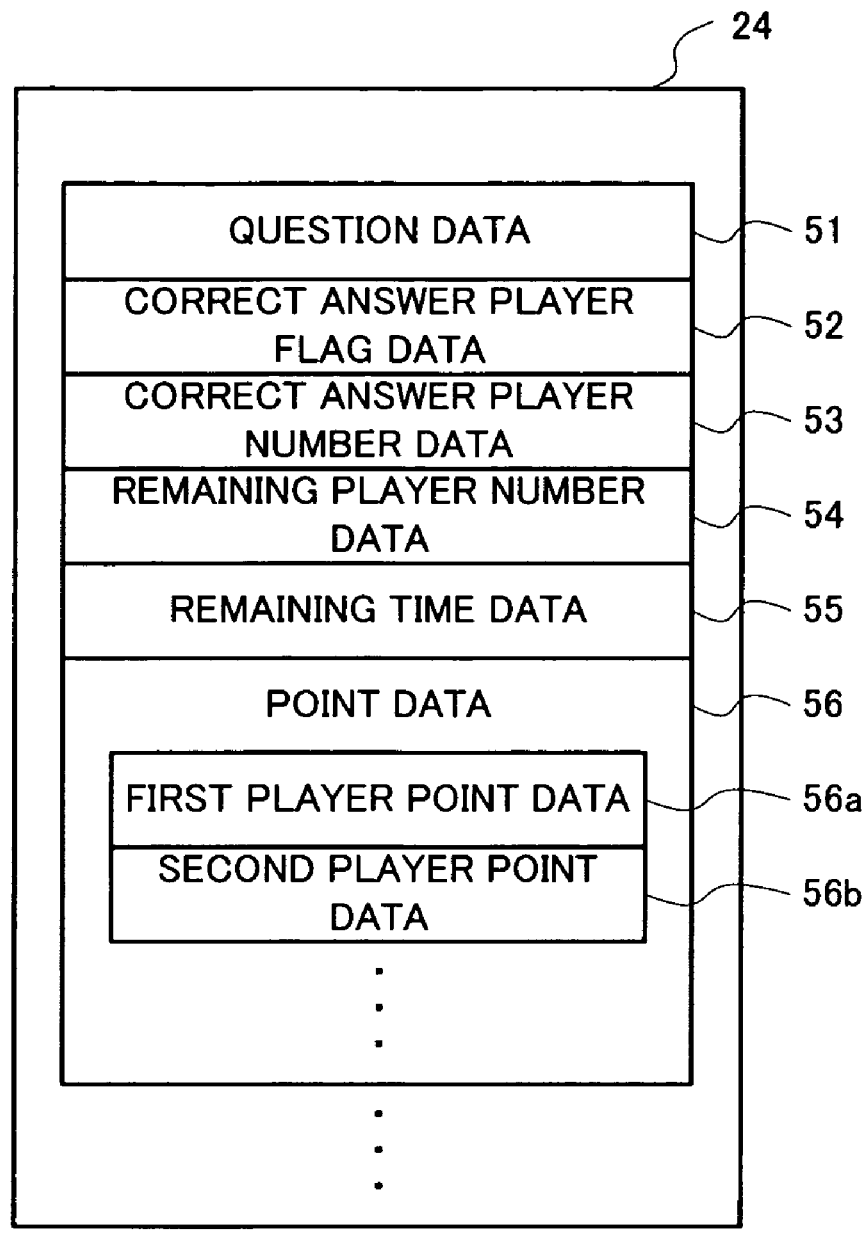
FIG. 5 shows main data used for game processes, which is stored in a RAM 24 of the game device 10.

Hereinafter, game processes performed by the game device 10 of the first embodiment will be described. First, main data used for the game processes will be described with reference to FIG. 5. FIG. 5 shows the main data stored in the RAM 24 of the game device 10. As shown in FIG. 5, the RAM 24 stores question data 51, correct answer player flag data 52, correct answer player number data 53, remaining player number data 54, remaining time data 55 and point data 56. In addition to these types of data shown in FIG. 5, the RAM 24 also stores essential data for the game processes such as image data used for game images.

The question data 51 contains information associated with a question to be given (i.e., information indicating the question and a correct answer thereof). The RAM 24 stores the question data 51 for each question of each mini game. Further, the RAM 24 stores the question data 51 for each difficulty level of each question. Note that, for a plurality of questions of a same type (i.e., a plurality of questions included in one mini game), the RAM 24 may store, instead of storing a plurality of pieces of question data 51, a piece of question data 51 necessary for generating the plurality of questions. When the game device 10 gives a plurality of questions, the device 10 randomly generates the questions based on the piece of question data 51 while using, e.g., random numbers. Thus, the game device 10 generates a plurality of different questions of a same type.

The correct answer player flag data 52 indicates a correct answer player flag. The correct answer player flag indicates, during a period of time from when the game device 10 gives a question until the game device 10 stops accepting an answer from a player using the game device 10, whether or not any of the plurality of players has already given a correct answer to the question. If there exists any player who has already given a correct answer to the question, a value of the correct answer player flag is set to "1", and if there does not exist a player who has given a correct answer to the question, the value of the correct answer player flag is set to "0".

The correct answer player number data 53 shows the number of players each having given a correct answer. When the game device 10 gives a question, a value of the correct answer player number data 53 is set to "0". The value is incremented by 1 each time any one of the plurality of players gives a correct answer to the question. A value of the remaining player number data 54 indicates the number of remaining players who have not answered the question yet. When the game device 10 gives a question, the value of the remaining player number data 54 is set to the total number of players. Each time any one of the players gives an answer to the question, the value is decremented by 1 regardless whether the answer is correct or not. The remaining time data 55 indicates the remaining time left before the correct answer elapsed time reaches the time limit.

The point data 56 indicates the number of points each player has. The RAM 24 of the game device 10 stores the point data 56 of not only a player using the game device 10 but all the players participating in the game. To be specific, if the number of players participating in the game is n (n is an integer number greater than 1), point data of a first player to point data of an nth player (e.g., first player point data 56a, second player point data 56b, etc) are stored in the RAM 24.

Figure 6:
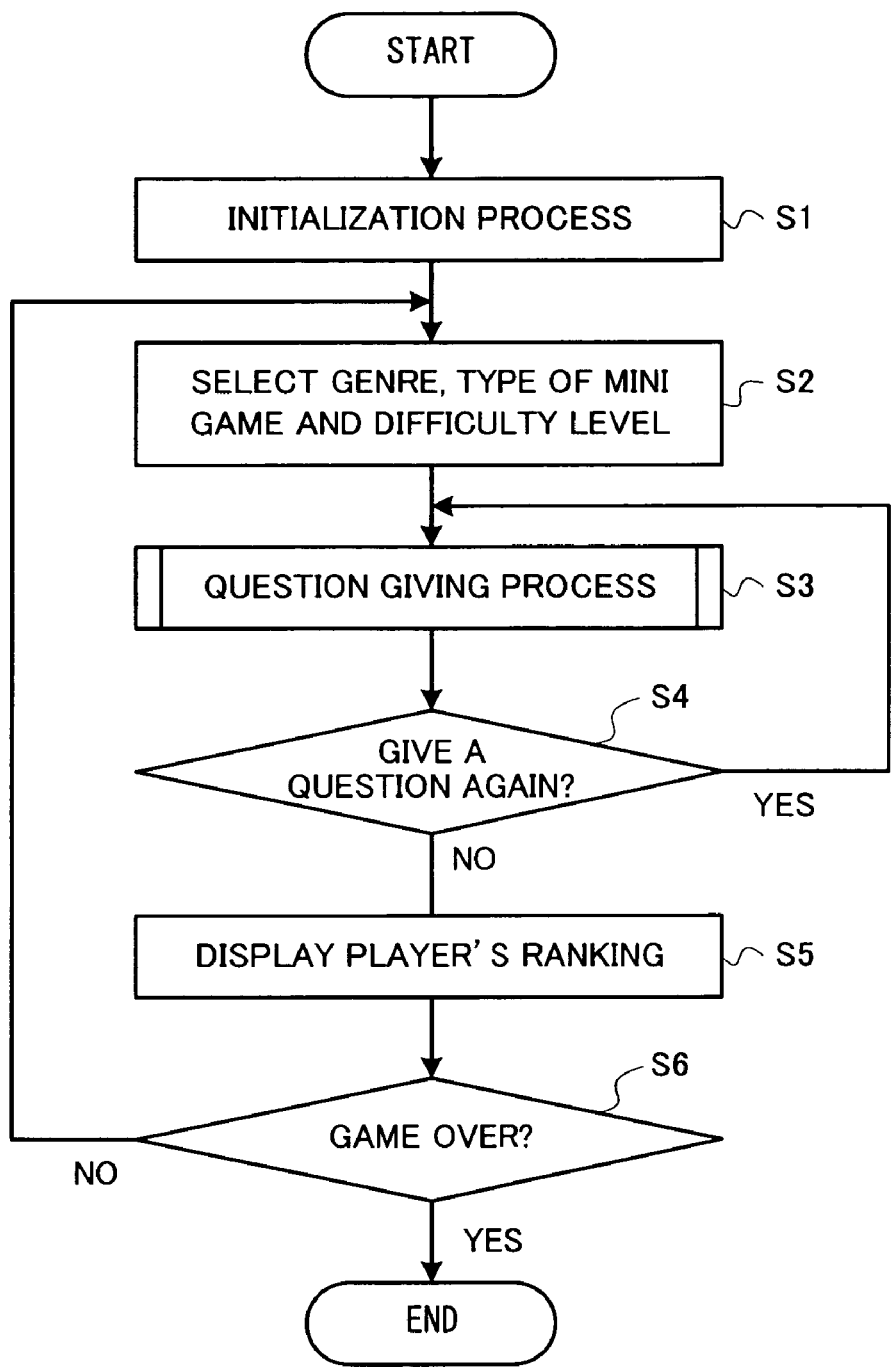
FIG. 6 shows a flowchart showing a sequence of the game processes performed by the game device 10.

Next, the game processes, which the game device 10 performs in accordance with the game program, will be described in detail with reference to FIGS. 6 to 11. FIG. 6 is a flow chart showing a sequence of the game processes performed by the game device 10. When power is supplied to the game device 10, the CPU core 21 of the game device 10 executes a boot program stored in a boot ROM (not shown in a drawing) to initialize each unit such as the RAM 24. Then, the game program stored in the memory card 17 is loaded to the RAM 24, and the game program having been loaded to the RAM 24 is executed by the CPU core 21. The flowchart shown in FIG. 6 shows the game processes which are performed after such a boot process is completed.

First, an initial process is performed at step S1 of FIG. 6. In the initial process, necessary data to start the game is transmitted from the main device to each subordinate device. The game device 10 being the main device transmits, to each subordinate device, data such as question data of each question stored in the RAM 24 and data indicating a genre of each question and a type of each mini game. Each subordinate device receives such data, and stores the data in the RAM 24. After step S1, a process at step S2 is performed.

After step S1, an iteration of processes at steps S2 to S6 is repeatedly performed until the game is determined to end. The iteration of processes at steps S2 to S6 is performed once for one mini game, i.e., a minimum unit of game, to determine rankings of the players. To be specific, the genre of questions, the type of mini game (i.e., the type of questions) and the difficulty level of the questions are selected for one mini game (step S2). The plurality of questions of a same type are given (steps S3 and S4) until any player acquires the predetermined number of points. Then, each player is given a ranking (step S5) based on the number of points thereof. Hereinafter, the processes at steps S2 to S6 will be described in detail.

At step S2, the genre of questions, the type of mini game and the difficulty level of questions (hereinafter, collectively referred to as "question genre and the like") are selected. In the present embodiment, the player using the main device selects the question genre and the like. To be specific, the main device displays an image representing each genre on the first LCD 11 or the second LCD 12, and accepts from the player an input operation selecting a genre. When the input operation selecting a genre is performed by the player, the main device displays, on the first LCD 11 or the second LCD 12, an image representing each mini game of the selected genre, and then accepts from the player an input operation selecting a mini game. When the input operation selecting a mini game is performed by the player, the main device displays, on the first LCD 11 or the second LCD 12, an image prompting the player to select the difficulty level of questions of the selected mini game, and then accepts from the player an input operation selecting the difficulty level. The question genre and the like are thus selected by the player. The main device transmits, to each subordinate device, data indicating the selected genre, data indicating the selected mini game and data indicating the selected difficulty level. The data indicating the genre is, for example, a piece of data indicating a number to identify the genre. Similarly, the data indicating the mini game is, for example, a piece of data indicating a number to identify the mini game. By transmitting these pieces of data from the main device to each subordinate device, all the game devices 10 recognize the selected genre, mini game and difficulty level. Also at step S2, the point data 56 of each player stored in the RAM 24 is reset. To be specific, the CPU core 21 resets the number of points indicated by the point data 56 to "0". After step S2, a process at step S3 is performed.

In the present embodiment, the player using the main device selects the question genre and the like. However, the question genre and the like may be selected in any manner. For example, when, after the game starts (i.e., after the CPU core 21 starts performing the processes shown in the flow chart of FIG. 6), the process at step S2 is performed for the second time or more, a player who has the highest score (or the lowest score) from a previous game may select the question genre and the like. Alternatively, the question genre and the like may be selected at random by any of the game devices 10. In such a case, the pieces of data indicating the question genre and the like are transmitted from the game device 10 having selected the question genre and the like to the other game device(s) 10.

At step S3, a question giving process is performed. In the question giving process, game processes are performed from when a question is given until the question ends. Hereinafter, the question giving process is described in detail.

Figure 7:
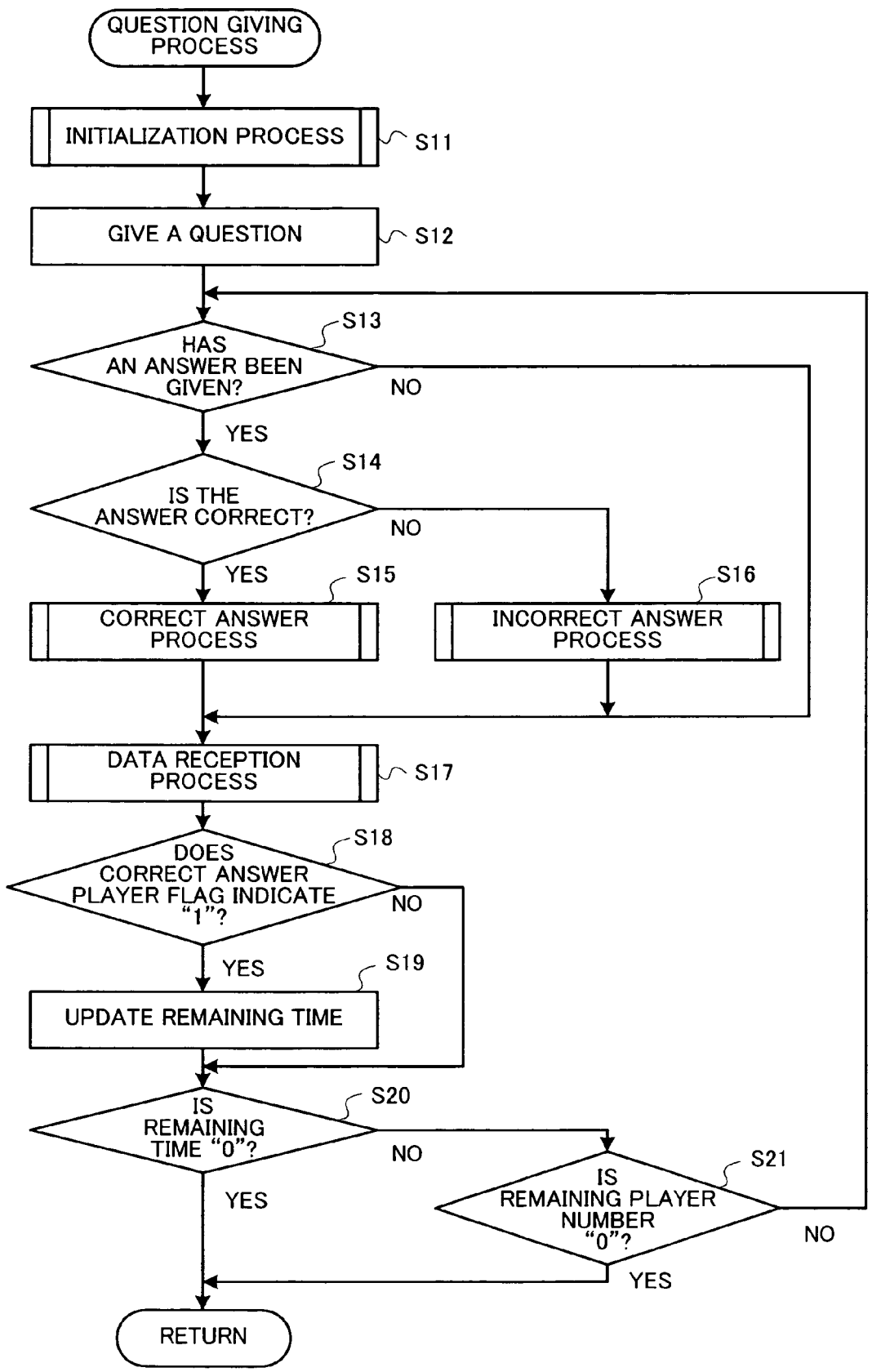
FIG. 7 shows a flowchart showing in detail a sequence of processes at step S3 shown in FIG. 6.

FIG. 7 is a flowchart showing in detail a sequence of processes of the question giving process at step S3 shown in FIG. 6. At step S11 of the question giving process, an initialization process is performed to initialize data necessary for the question giving process. Hereinafter, the initialization process is described in detail.

Figure 8:
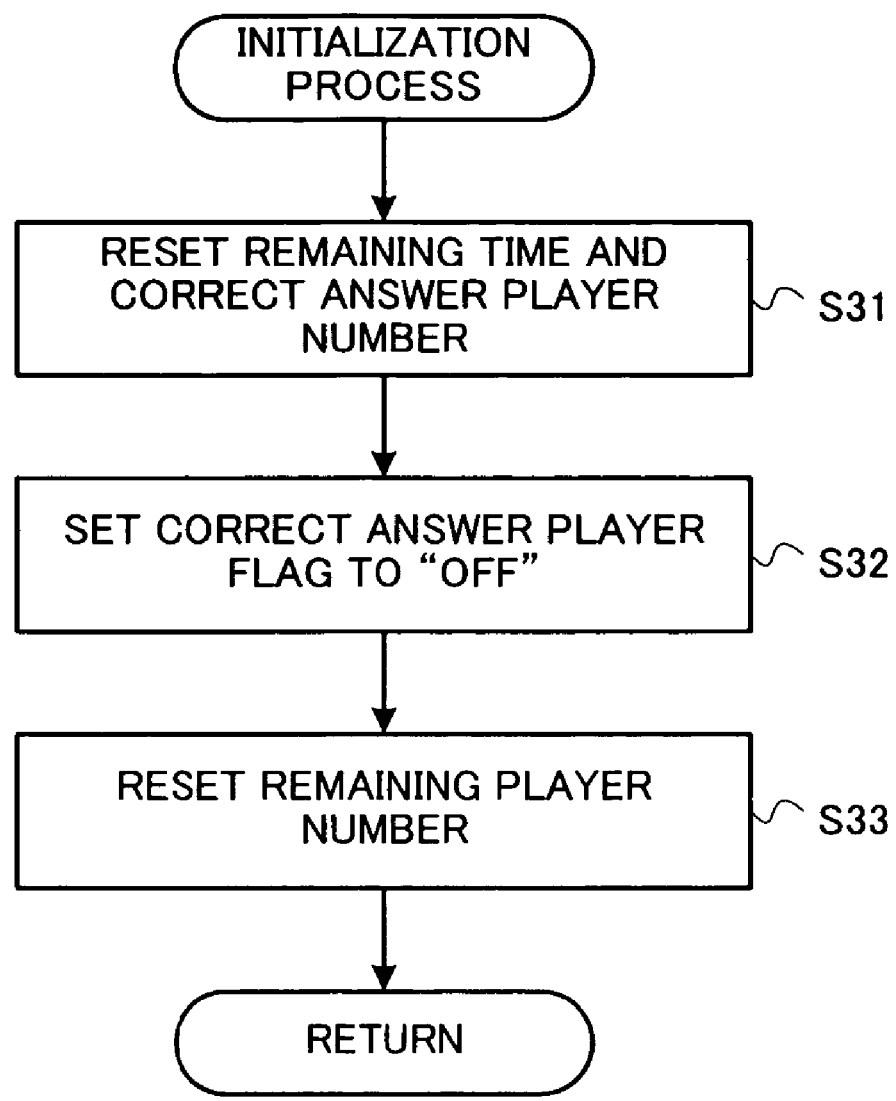
FIG. 8 is a flowchart showing in detail a sequence of processes at step S11 shown in FIG. 7.

FIG. 8 is a flowchart showing in detail a sequence of processes of the initialization process at step S11 shown in FIG. 7. At step S31 of the initialization process, the correct answer player number data 53 and the remaining time data 55 stored in the RAM 24 are reset. To be specific, the CPU core 21 updates the correct answer player number data 53 by using data indicating "0", and stores the updated correct answer player number data 53 in the RAM 24. Also, the CPU core 21 updates the remaining time data 55 by using data indicating a length of time being same as the predetermined time limit, and stores the updated remaining time data 55 in the RAM 24. At the following step S32, the correct answer player flag data 52 stored in the RAM 24 is reset. To be specific, the CPU core 21 updates the correct answer player flag data 52 by using data indicating "0", and stores the updated correct answer player flag data 52 in the RAM 24. At the following step S33, the remaining player number data 54 stored in the RAM 24 is reset. To be specific, the CPU core 21 updates the remaining player number data 54 by using data indicating the total number of players, and stores the updated remaining player number data 54 in the RAM 24. When these processes at steps S31 to S33 are completed, the CPU core 21 ends the initialization process.

Refer to FIG. 7 again. A question is given at step S12 following steps 11. To be specific, the main device first transmits, to each subordinate device, data specifying the question to give (e.g., data indicating a number to identify the question). Upon receiving the data from the main device, each subordinate device recognizes the question to give. Next, each game device 10 displays the question on the first LCD 11 and the second LCD 12 (refer to FIGS. 3A and 3B). Here, a timing of displaying the question is synchronized between each game device 10. At steps S13 to S21 following step S12, each game device 10 performs processes, e.g., accepting an answer from a corresponding player and determining whether or not the answer is correct. Note that, an iteration of processes at steps S13 to S21 is performed at predetermined time intervals (e.g., performed at each time frame).

At step S13, the game device 10 determines whether a player using the device 10 has inputted an answer. To be specific, the CPU core 21 of the game device 10 reads, from the touch panel 12, coordinate data indicating a point where a touch input has been provided, and determines, based on the coordinate data, whether or not the player has inputted an answer. Here, the CPU core 21 also determines whether the player has completed answering. For example, in the case where the question shown in FIGS. 3A and 3B is given, the player is required to select two areas out of the four areas 42 to 45. Accordingly, when the two areas out of the four areas 42 to 45 have been selected, the CPU core 21 determines that the answer has been inputted. In other words, in the case where the question shown in FIGS. 3A and 3B is given, selecting only one area does not have answering completed. When it is determined at step S13 that the player has inputted an answer, a process at step S14 is performed. When it is determined at step S13 that the player has not inputted an answer, processes at steps S14 to S16 are skipped, and a process at step S17 is performed.

It is determined at step S14 whether or not the answer inputted by the player is correct. To be specific, the CPU core 21 refers to the question data 51 stored in the RAM 24, the question data 51 containing information indicating the question and a correct answer thereof. Then, the CPU core 21 determines whether or not the answer inputted by the player is correct. When it is determined at step S14 that the answer inputted by the player is correct, the process at step S15 is performed. When it is determined at step S14 that the answer inputted by the player is not correct, the process at step S16 is performed.

Figure 9:
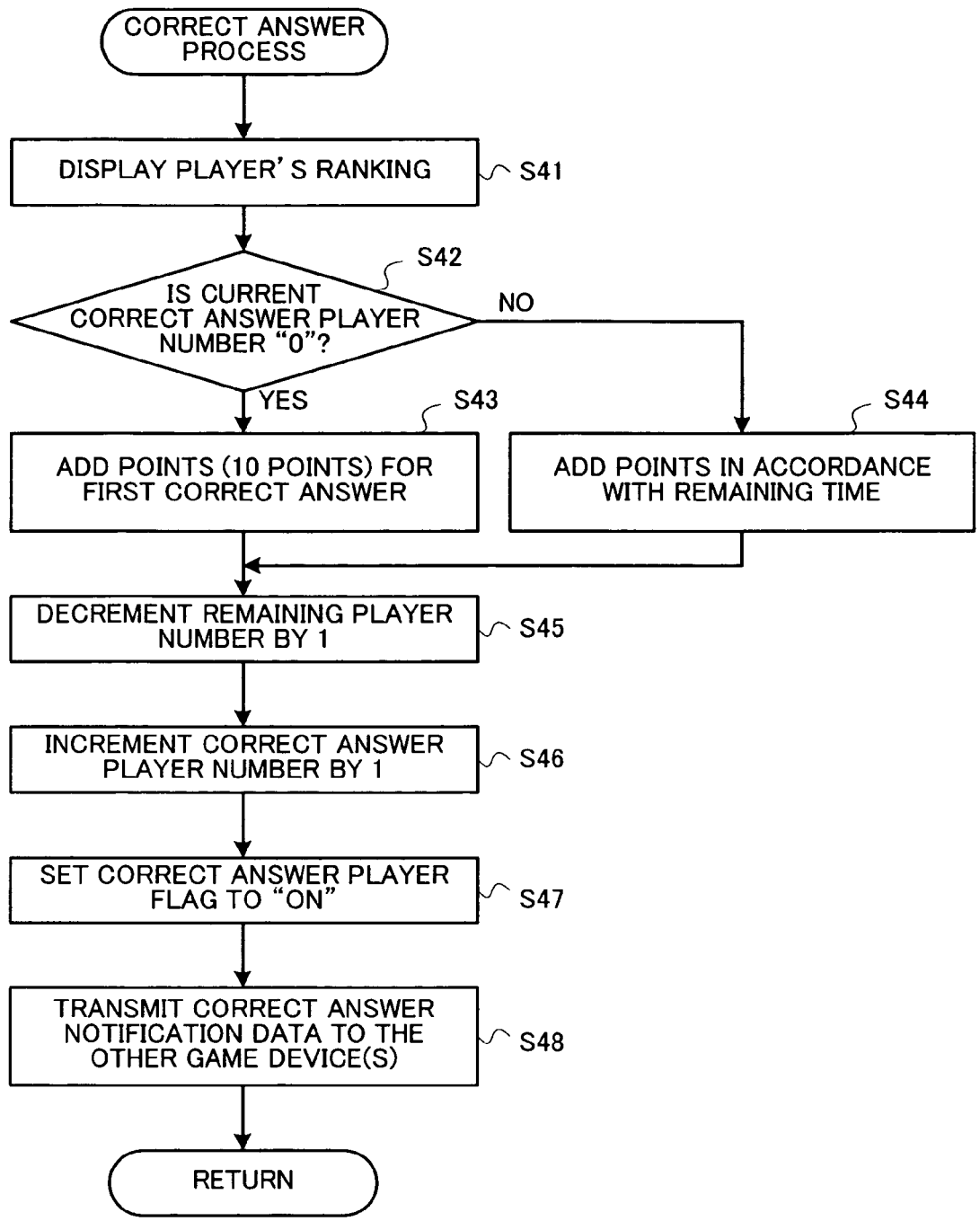
FIG. 9 is a flowchart showing in detail a sequence of processes at step S15 shown in FIG. 7.

At step S15, a correct answer process, which is a game process performed when the player has inputted a correct answer, is performed. FIG. 9 is a flowchart showing in detail a sequence of processes of the correct answer process at step S15 shown in FIG. 7. At step S41 of the correct answer process, a ranking of the player for a current question is displayed. The ranking indicates a position of the player among the plurality of players in terms of speed of giving a correct answer to the current question. To be specific, on the first LCD 11 and the second LCD 12, the CPU core 21 displays, as the ranking of the player, a number resulting from adding 1 to a current value of the correct answer player number data 53 stored in the RAM 24. After step S41, a process at step S42 is performed.

It is determined at step S42 whether or not the player has given a correct answer first. The determination at step S42 is performed by referring to the correct answer player number data 53 stored in the RAM 24. To be specific, when the correct answer player number data 53 indicates "0", the CPU core 21 determines that the player has given a correct answer first. When the correct answer player number data 53 indicates a number other than "0", the CPU core determines that the player is not the one who has given a correct answer first (i.e., the player has given a correct answer after any other player has given a correct answer).

When it is determined at step S42 that the player has given a correct answer first, a process at step S43 is performed. To be specific, at step S43, 10 points are added to the number of points of the player who has given a correct answer first. The CPU core 21 updates, by using the number of points resulting from adding 10 points to the number of current points of the player, a content of the point data 56 of the player stored in the RAM 24.

When it is determined at step S42 that the player is not the one who has given a correct answer first, a process at step S44 is performed. In the present embodiment, points (or a point) are added, in accordance with the remaining time, to the number of points of each player who is not the one having given a correct answer first, the points (or the point) being less than the points (i.e., 10 points) given to the player who has given a correct answer first. To be specific, at step S44, the number of points being same as the number of seconds of the remaining time is added to the number of points of each player who is not the one having given a correct answer first. For example, 3 points are added to the number of points of a player who has given a correct answer when the remaining time is 3 seconds. Note that, a fractional portion of the number of seconds of the remaining time is rounded up, and a resultant number is added as points (or a point). In more detail, the CPU core 21 obtains a number by rounding up a fractional portion of the number of seconds indicated by the remaining time data 55 stored in the RAM 24. Then, the CPU core 21 updates, by using the number of points resulting from adding the obtained number to the current number of points of the player, the content of the point data 56 of the player stored in the RAM 24.

In the present embodiment, points (or a point) are given to each player in accordance with the remaining time. However, in another embodiment of the present invention, the points (or the point) may be given to each player in accordance with the ranking thereof. For example, 10 points may be given to a first-ranked player (i.e., a player who has given a correct answer first); 8 points may be given to a second-ranked player; and 6 points may be given to a third-ranked player. Thus, points (or a point) to be given to each player may be predetermined in accordance with the ranking thereof.

After step S43 or step S44, a process at step S45 is performed. To be specific, at step S45, the value of the remaining player number data 54 stored in the RAM 24 is decremented by 1. At the following step S46, the value of the correct answer player number data 53 stored in the RAM 24 is incremented by 1. At the following step S47, the correct answer player flag is set to "ON". In other words, the value of the correct answer player flag data 52 stored in the RAM 24 is updated to "1". After step S47, a process at step S48 is performed.

At step S48, correct answer notification data is transmitted from the game device 10 to the other game device(s) 10. The correct answer notification data is for notifying to the other game device(s) 10 that the player of the game device 10 has given a correct answer to the question. To be specific, the correct answer notification data contains: data indicating an ID to identify the game device 10 among the plurality of game devices 10 playing the game; and data indicating the remaining time left when the player has given the correct answer. The data indicating the ID may be a number uniquely given to the game device 10. In the case where different numbers are respectively given to the plurality of game devices 10 when the plurality of devices 10 establish communications with each other, these numbers may be used as IDs. At step S48, the CPU core 21 transmits, to the other game device(s) 10, as the correct answer notification data, the data indicating the ID and the remaining time data 55 stored in the RAM 24. In another embodiment, the correct answer notification data transmitted from the game device 10 may contain, instead of the remaining time data 55, the point data 56 of the player using the game device 10. After the process at step S48 is completed, the CPU core 21 ends the correct answer process.

Figure 10:
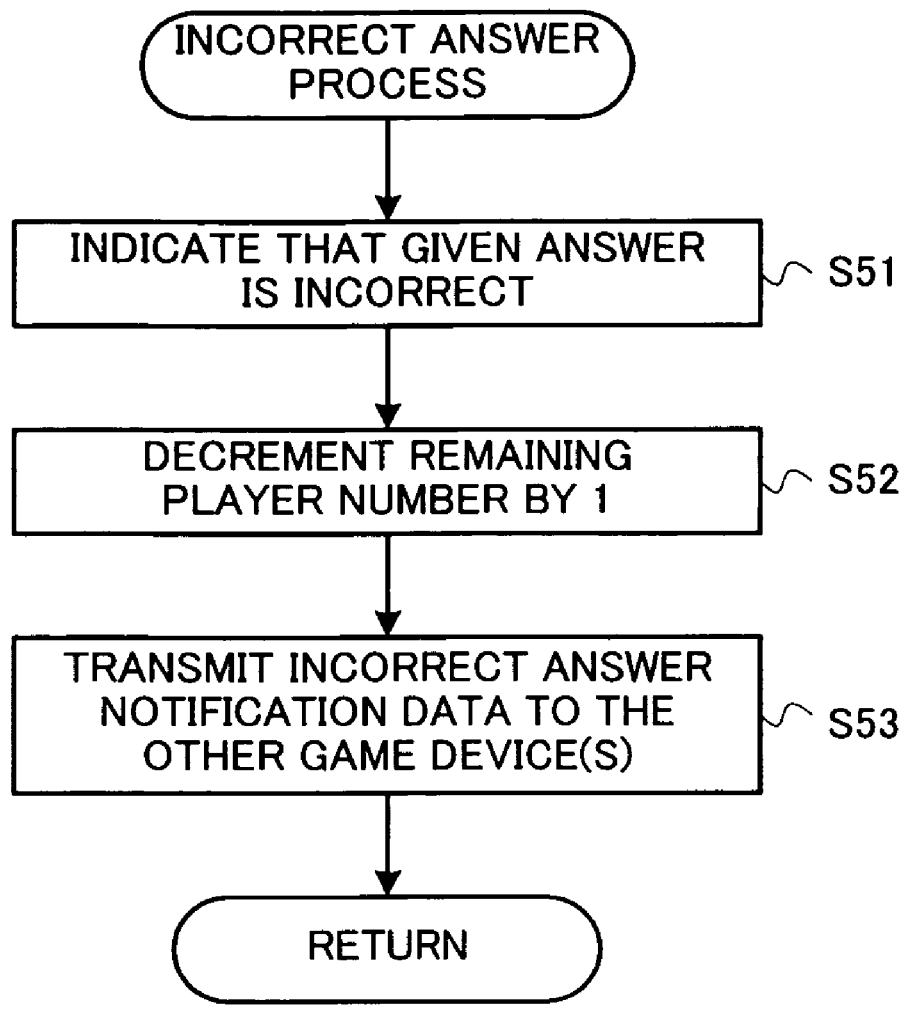
FIG. 10 is a flowchart showing in detail a sequence of processes at step S16 shown in FIG. 7.

Refer to FIG. 7 again. At step S16, an incorrect answer process, which is a game process performed when the player has not inputted the correct answer, is performed. FIG. 10 is a flowchart showing in detail a sequence of processes of the incorrect answer process at step S16 shown in FIG. 7. At step S51 of the incorrect answer process, a text message and/or an image indicating that the player has not inputted the correct answer is displayed on the first LCD 11 or the second LCD 12. After step S51, a process at step S52 is performed.

At step S52, the value of the remaining player number data 54 stored in the RAM 24 is decremented by 1. The process at step S52 is same as the process at step S45. At the following step S53, the game device 10 transmits incorrect answer notification data to the other game device(s) 10. The incorrect answer notification data is for notifying to the other game device(s) 10 that the player has not given the correct answer to the question. To be specific, the incorrect answer notification data contains at least the data indicating the ID to identify the game device 10 among the plurality of game devices 10 playing the game. In other words, the CPU core 21 transmits, to the other game device(s) 10, the data indicating the ID as the incorrect answer notification data. In the present embodiment, since the correct answer notification data contains the remaining time data whereas the incorrect answer notification data does not contain the remaining time data, the other game device(s) 10 can recognize whether received data is the correct answer notification data or the incorrect answer notification data. After step S53 has been completed, the CPU core 21 ends the incorrect answer process. In the incorrect answer process, a particular number of points may be taken from the number of points of the player who has not given a correct answer to the question.

Refer to FIG. 7 again. After step S15 or step S16, a data reception process at step S17 is performed. In the data reception process, the correct answer notification data or the incorrect answer notification data transmitted from another game device 10 is received. In the data reception process, the CPU core 21 determines whether or not a player of another game device 10 has given a correct answer to the question, and then performs a game process in accordance with a result of the determination. Hereinafter, the data reception process is described in detail.

Figure 11:
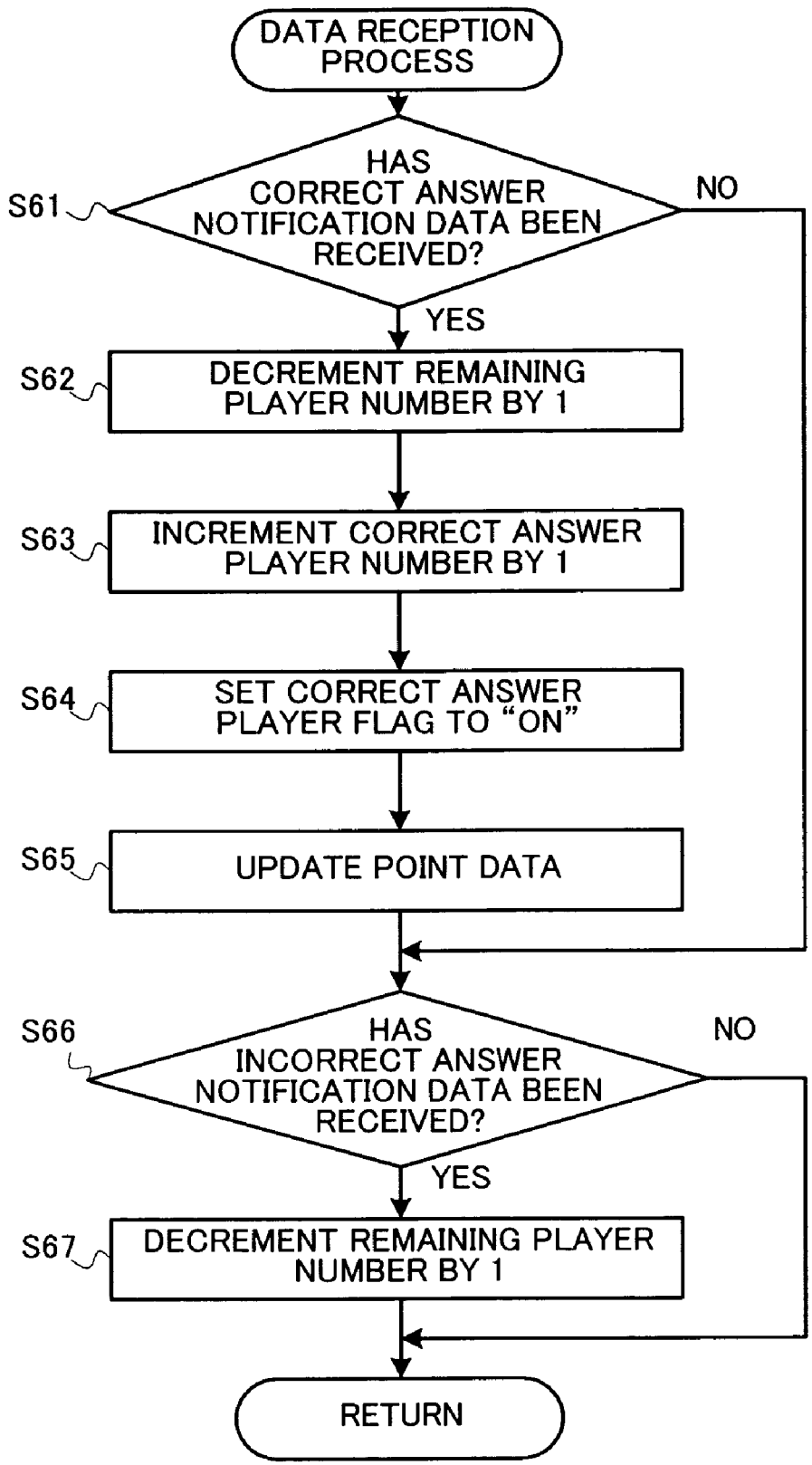
FIG. 11 is a flowchart showing in detail a sequence of processes at step S17 shown in FIG. 7.

FIG. 11 is a flowchart showing in detail a sequence of processes of the data reception process at step S17 shown in FIG. 7. It is determined at step S61 of the data reception process whether or not the game device 10 has received the correct answer notification data from another game device 10. In the case where the game device 10 has received the correct answer notification data from another game device 10, processes at steps S62 to S65 are performed. In the case where the game device 10 has not received the correct answer notification data from another game device 10, the processes at steps S62 to S65 are skipped, and a process at step S66 is performed. The processes at steps S62 to S65 are performed when a player of any other game device 10 has given a correct answer to the question.

At step S62, the value of the remaining player number data 54 stored in the RAM 24 is decremented by 1. The process at step S62 is same as the process at step S45. At the following step S63, the value of the correct answer player number data 53 stored in the RAM 24 is incremented by 1. At the following step S64, the correct answer player flag is set to "ON". A process at step S63 is same as the process at step S46, and the process at step S64 is same as the process at step S47. After step S64, the process at step S65 is performed.

At step S65, the number of points of a player using another game device 10 having transmitted the correct answer notification data is updated. The process at step S65 is same as the processes at steps S42 to S44 shown in FIG. 9. To be specific, the CPU core 21 determines whether or not the value of the correct answer player number data 53 stored in the RAM 24 is "0". When the value of the correct answer player number data 53 is "0", 10 points are added to the number of points of the player using said another game device 10 having transmitted the correct answer notification data since the player is the one who has given a correct answer first. When the value of the correct answer player number data 53 is not "0", the number of points being same as the number of seconds of the remaining time is added to the number of points of the player of said another game device 10. Here, the remaining time is indicated by the remaining time data 55 contained in the correct answer notification data transmitted from said another game device 10, and the number of points to be added is obtained by rounding up a fractional portion of the number of seconds of the remaining time. To be specific, the CPU core 21 obtains a number by rounding up a fractional portion of the number of seconds indicated by the remaining time data 55 contained in the received correct answer notification data. Then, the CPU core 21 updates, by using the number of points resulting from adding the obtained number to a current number of points of the player of said another game device 10, the content of the point data 56 of the player stored in the RAM 24. After step S65, a process at step S66 is performed.

It is determined at step S66 whether the game device 10 has received the incorrect answer notification data from another game device 10. When it is determined that the game device 10 has received the incorrect answer notification data, a process at step S67 is performed. When it is determined that the game device has not received the incorrect answer notification data from another game device 10, the process at step S67 is skipped, and the CPU core 21 ends the data reception process. At step S67, the value of the remaining player number data 54 stored in the RAM 24 is decremented by 1. The process at step S67 is same as the process at step S62 and the process at step S45. After the process at step S67 is completed, the CPU core 21 ends the data reception process.

Refer to FIG. 7 again. It is determined at step S18 following step S17 whether or not any player has given a correct answer to the question. To be specific, the CPU core 21 determines whether the value of the correct answer player flag data 52 stored in the RAM 24 is "1". When the value of the correct answer player flag data 52 is "1", the CPU core 21 determines that there exists a player who has given a correct answer to the question, and performs a process at step S19. When the value of the correct answer player flag data 52 is "0", the CPU core 21 determines that there does not exist a player who has given a correct answer to the question, and the process at step S19 is skipped.

At step S19, the remaining time is updated. As described above, the iteration of processes at steps S13 to step S21 is performed at predetermined time intervals (e.g., performed at each time frame). Accordingly, the CPU core 21 repeatedly updates the content of the remaining time data 55 stored in the RAM 24 by using the number of seconds obtained as a result of subtracting a predetermined length of time from a current remaining time. When updating of the remaining time starts, the remaining time is displayed on the second LCD 12 (refer to the image 46 in FIG. 4). The remaining time is not required to be displayed in detail. The remaining time may be simply displayed in the form of the number of seconds. After step S19, a process at step S20 is performed.

As shown in the descriptions of steps S18 and S19 of the present embodiment, when there exists a player who has given a correct answer to the question, the remaining time is repeatedly decremented for update, and when there does not exist a player who has given a correct answer to the question, the remaining time is not updated. Thus, the countdown of the remaining time starts when any player has given a correct answer to the question. In other words, the time limit is set when any player has given a correct answer.

It is determined at step S20 whether the remaining time has become "0". To be specific, the CPU core 21 determines whether the value of the remaining time data 55 is "0". Here, the remaining time becomes "0" when the elapsed time measured from when any player has given a correct answer (i.e., correct answer elapsed time) reaches the predetermined time limit (i.e., 5 seconds). In other words, the process at step S20 is for determining whether the correct answer elapsed time has reached the time limit. When it is determined at step S20 that the remaining time has not become "0" yet, the process at step S21 is performed. When it is determined at step S20 that the remaining time has become "0", the process at step S21 is skipped, and the CPU core 21 ends the question giving process. Thus, in the present embodiment, the CPU core 21 stops accepting an input of an answer to the question when the correct answer elapsed time reaches the time limit.

It is determined at step S21 whether the number of players who have not answered the question has become "0". To be specific, the CPU core 21 determines whether the value of the remaining player number data 54 has become "0". When the value of the remaining player number data 54 has not become "0" yet, the process at step S13 is performed again. Thereafter, the processes at steps S13 to S21 are repeatedly performed until the value of the remaining player number data 54 becomes "0", or the remaining time becomes "0". When the value of the remaining player number data 54 has become "0", the CPU core 21 ends the question giving process.

As shown in the descriptions of steps S20 and S21 of the present embodiment, the question ends when the number of players who have not answered the question has become "0", or the remaining time has become "0". In other words, once all the players have answered the question, the game proceeds to a next question. This eliminates an unnecessary waiting time for the players.

Refer to FIG. 6 again. It is determined, at step S4 following step S3, whether the mini game should continue (i.e., whether the same type of question should be given again). This determination is made based on whether or not any player has acquired the predetermined number of points (i.e., 50 points). To be specific, the CPU core 21 determines whether there exists a piece of point data 56 indicating 50 points or greater among a plurality of pieces of point data 56 stored in the RAM 24, the plurality of pieces of point data 56 respectively corresponding to the plurality of players. If there does not exist a piece of point data 56 indicating 50 points or greater, the CPU core 21 determines to give the same type of question, and performs the process at step S3 again. Thereafter, the processes at steps S3 and S4 are repeatedly performed until any one of the players has acquired 50 points or more. If there exists a piece of point data 56 indicating 50 points or greater, the CPU core 21 determines to stop giving the same type of question, and performs a process at step S5.

At step S5, the ranking of the player is displayed. To be specific, the CPU core 21 refers to the plurality of pieces of point data 56 stored in the RAM 24 respectively corresponding to the plurality of players, and determines, based on the number of points the player has acquired, the ranking of the player among the plurality of players. Then, the game device 10 displays the ranking on the first LCD 11 or the second LCD 12. The mini game ends when these processes at steps S2 to S5 are completed.

The CPU core 21 determines at step S6 whether or not to end the game. To be specific, this determination is made based on, for example, whether the player has inputted to the game device 10 an instruction to end the game. When the CPU core 21 determines not to end the game at step S6, the process at step S2 is performed again. Thereafter, the processes at steps S2 to S6 are repeatedly performed until the CPU core 21 determines to end the game. When the CPU core 21 determines to end the game at step S6, the CPU core 21 terminates performing the game processes shown in FIG. 6.

In the above embodiment, each time a question is given, the main device transmits at step S12, to each subordinate device, question data indicating the question. In another embodiment, above-mentioned question data for generating a plurality of questions of one mini game may be prepared, and such question data may be transmitted together with random numbers from the main device to each subordinate device. This eliminates the necessity of transmitting the question data each time a question is given. For example, in the case where the question shown in FIGS. 3A and 3B is given, data regarding other than the number of each kind of fruit may be prepared as the question data, and the number of each kind of fruit may be determined using the random numbers. In such a manner, while one mini game continues (i.e., while the same type of questions are given or while the iteration of processes at steps S3 and S4 is repeatedly performed), the question data is not required to be transmitted more than once. To be specific, the question data is required to be transmitted just once only at the beginning of the mini game. For example, when the type of questions is selected at step S2, data indicating the type may be transmitted together with the random numbers from the main device to each subordinate device.

The present embodiment has been described above by taking, as an example, the game in which the plurality of players participate in the quiz game. Those who participate in the quiz game may be not only players (i.e., persons) but also including a virtual player whose answering is controlled by the game device 10. Hereinafter, the game device 10 and game processes performed in the case where such a virtual player is included among participants of the quiz game are described as a second embodiment of the present invention.

Second Embodiment

Since the game device 10 according to the second embodiment is same as the game device 10 shown in FIGS. 1 and 2, a detailed description thereof will be omitted. In the second embodiment, game processes performed by the game device 10 are different from those of the first embodiment. Hereinafter, the second embodiment will be described with a focus on the game processes.

Figure 12:
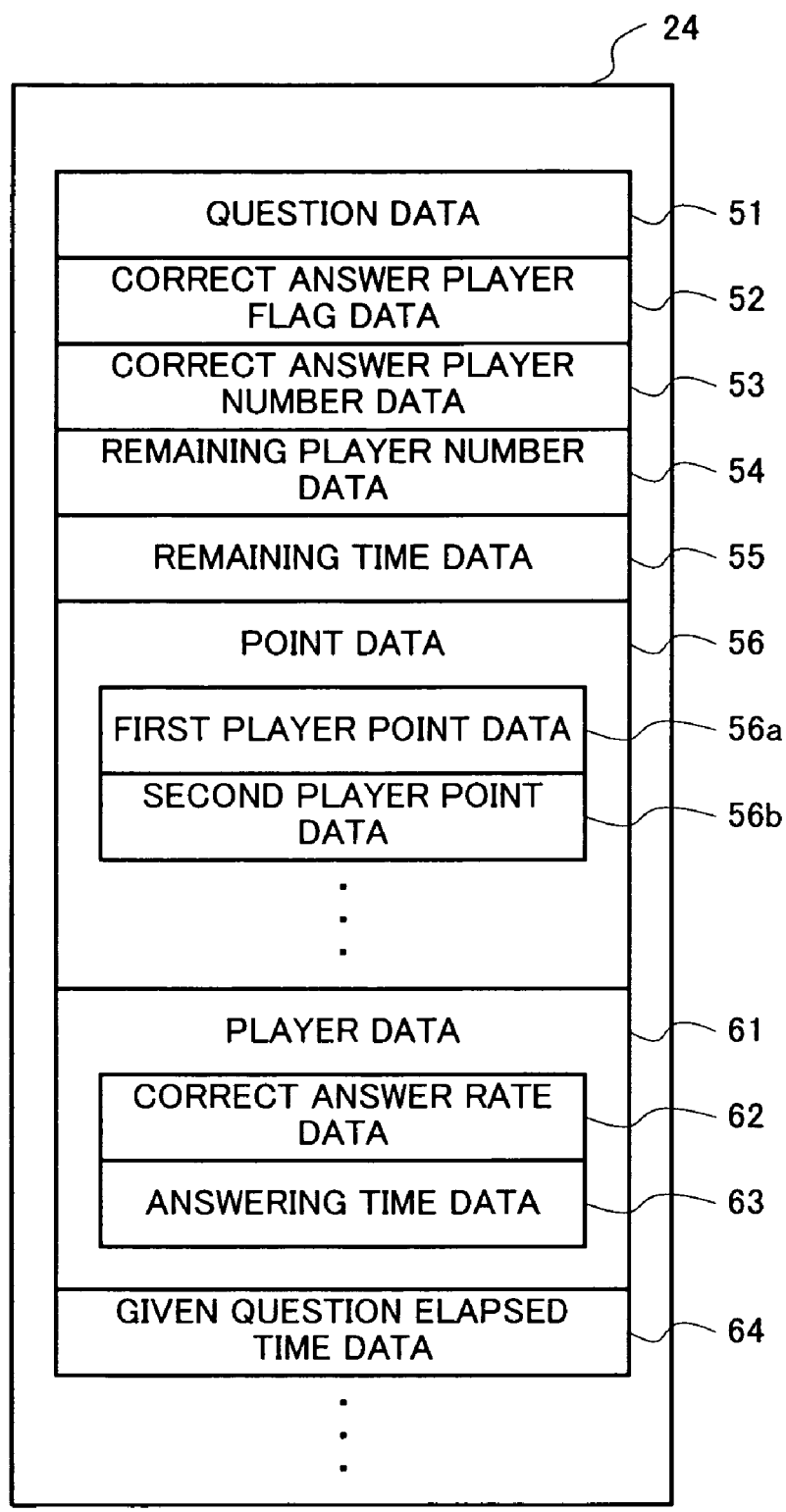
FIG. 12 shows main data used for game processes, which is stored in the RAM 24 of the game device 10 according to a second embodiment.

FIG. 12 shows main data used for the game processes, which is stored in the RAM 24 of the game device 10 according to the second embodiment. As shown in FIG. 12, the RAM 24 stores, in addition to the data shown in FIG. 5, player data 61 and given question elapsed time data 64. In FIG. 12, data which is identical with the data shown in FIG. 5 is denoted by a same reference numeral as that used for the data shown in FIG. 5, and a detailed description thereof will be omitted.

The player data 61 shows attributes of a manner in which the above-mentioned virtual player answers questions. To be specific, the player data 61 contains correct answer rate data 62 and answering time data 63. The correct answer rate data 62 shows a correct answer rate of the virtual player. To be specific, the correct answer rate is indicated within a range from 0 (i.e., 0%) to 100 (i.e., 100%). The answering time data 63 indicates a length of time from when a question is given until the virtual player gives an answer (hereinafter, referred to as an "answering time"). In the present embodiment, the correct answer rate data 62 and the answering time data 63 for one virtual player are set for every possible combination of the genres, mini games and difficulty levels. For example, in the case where there are: five genres; three mini games for each genre; and six difficulty levels for each mini game, 90 (5×3×6=90) different pieces of correct answer rate data 62 and 90 different pieces of answering time data 63 are set for one virtual player. The player data 61 may be set by the game program in advance, or generated based on a history of answers previously given by any player.

The given question elapsed time data 64 shows an elapsed time measured from a point when a question is given. Here, the point when the question is given may be a point when the question is displayed on the screen of the game device 10, or a point when the game device 10 starts accepting an input of an answer from a player using the device 10.

In the second embodiment, the RAM 24 stores, in addition to the plurality of pieces of point data 56 respectively indicating the numbers of points of the plurality of players, a piece of point data 56 indicating the number of points of the virtual player. Note that, the number of virtual players may be any number.

Next, the game processes of the second embodiment will be described in detail with reference to FIGS. 12 to 15. Similarly to the first embodiment, in the second embodiment, the game processes are performed in accordance with the flowchart shown in FIG. 6. In the second embodiment, the question giving process is partially different from that of the first embodiment. Hereinafter, the question giving process of the second embodiment is described in detail.

Figure 13:
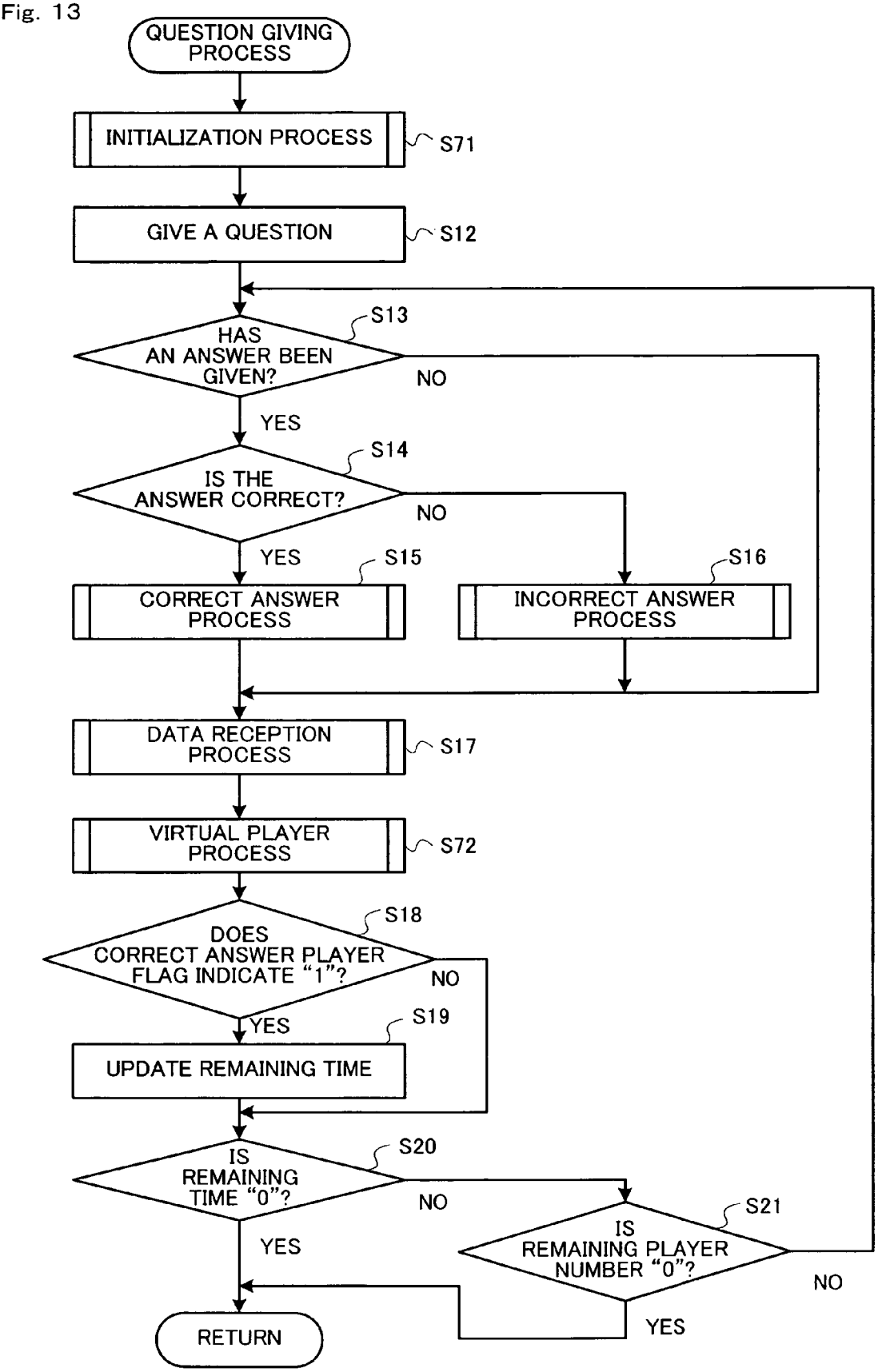
FIG. 13 is a flowchart showing in detail a question giving process of the second embodiment.

FIG. 13 is a flowchart showing in detail the question giving process of the second embodiment. In FIG. 13, a step indicating a same process as that indicated by a step of FIG. 7 is denoted by a same step number as that used for the step of FIG. 7, and a detailed description thereof will be omitted. In the question giving process of the second embodiment, an initialization process is performed at step S71. The initialization process at step S71 is different from the initialization process of the first embodiment. Further, the question giving process of the second embodiment is different from that of the first embodiment in that the question giving process of the second embodiment contains a virtual player process performed at step S72 following step S17.

Figure 14:
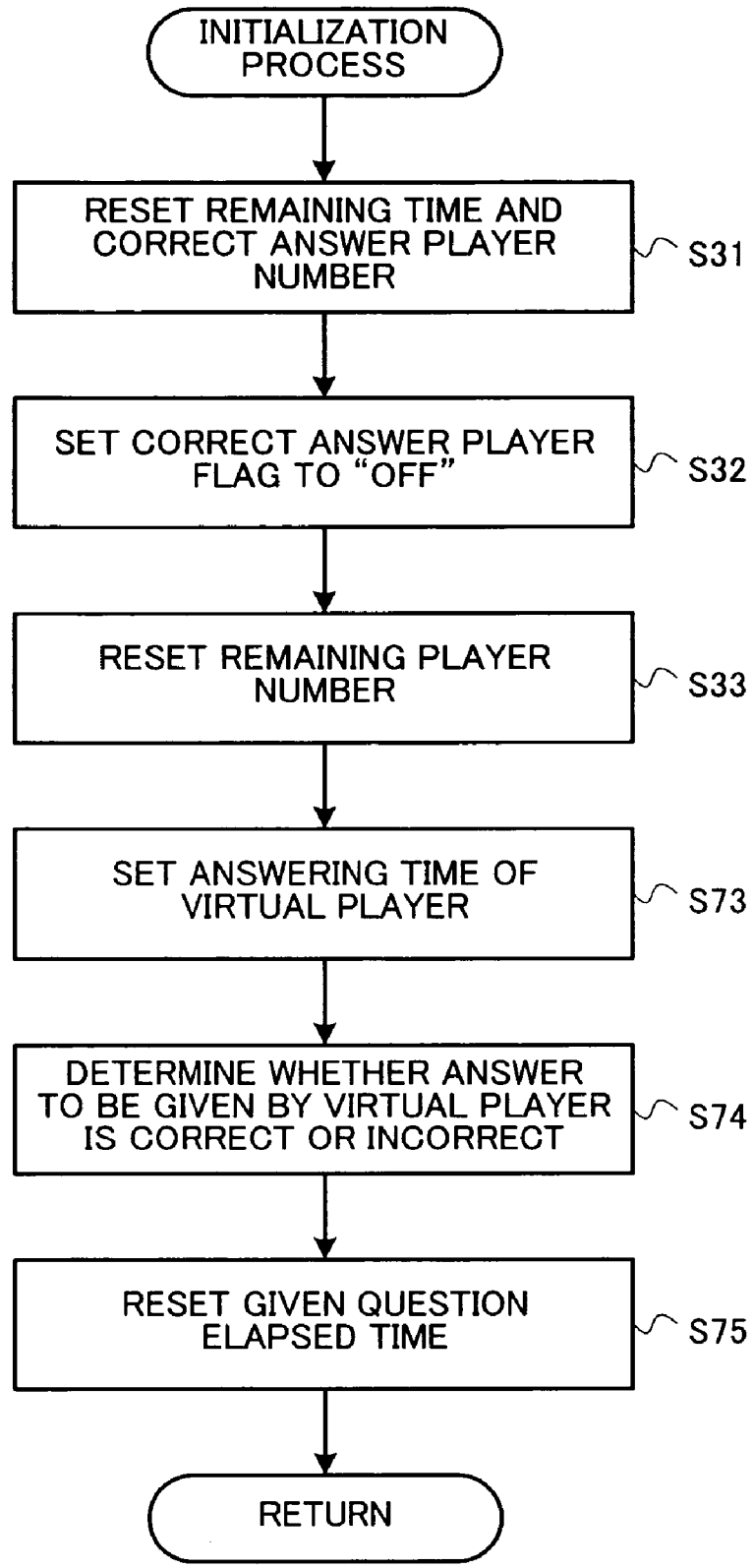
FIG. 14 is a flowchart showing in detail an initialization process of the second embodiment.

FIG. 14 is a flowchart showing in detail the initialization process of the second embodiment. In FIG. 14, a step indicating a same process as that indicated by a step of FIG. 8 is denoted by a same step number as that used for the step of FIG. 8, and a detailed description thereof will be omitted. Similarly to the first embodiment, the processes at steps S31 to S33 are first performed in the initialization process of the second embodiment, and then a process at step S73 is performed after step S33. At step S73, a length of time from when a question is given until the virtual player gives an answer to the question (i.e., answering time) is set. To be specific, the CPU core 21 sets the answering time based on the answering time data 63 of the player data 61 stored in the RAM 24. For example, the CPU core 21 randomly sets the answering time such that the answering time is within a predetermined range of time length, the predetermined range covering from a time length shorter, by a predetermined time length, than the answering time indicated by the answering time data 63 to a time length longer, by the predetermined time length, than the answering time indicated by the answering time data 63. As a result, the virtual player answers (refer to below-described step S72), in the set answering time, a question given at later performed step S12. After step S73, a process of step S74 is performed.

It is determined at step S74 whether or not an answer to be given by the virtual player is correct. In other words, it is determined whether the virtual player should give a correct answer or an incorrect answer. To be specific, the CPU core 21 determines, based on the correct answer rate data 62 of the player data 61 stored in the RAM 24, an answer of the virtual player (i.e., correct answer or incorrect answer). For example, the CPU core 21 randomly determines the answer in accordance with a correct answer rate indicated by the correct answer rate data 62. In the case where the correct answer rate is set as 80%, the probability that the CPU core 21 determines an answer given by the virtual player to be correct is 80%. Similarly to the answering time, the CPU core 21 may randomly set the correct answer rate such that the correct answer rate is within a predetermined range of percentage value, the predetermined range covering from a percentage value higher, by a predetermined percentage value, than the correct answer rate indicated by the correct answer rate data 62 to a percentage value lower, by the predetermined percentage value, than the correct answer rate indicated by the correct answer rate data 62. Then, the CPU core 21 may randomly determine, in accordance with the set correct answer rate, whether an answer to be given by the virtual player is correct or incorrect. After step S74, a process at step S75 is performed.

At step S75, a time indicated by the given question elapsed time data, i.e., a given question elapsed time, is reset. To be specific, the CPU core 21 updates a content of the given question elapsed time data 64 stored in the RAM 24 by using data indicating a value of "0". After the process at step S75 is completed, the CPU core 21 ends the initialization process.

Refer to FIG. 13 again. Processes at steps S12 to S17 are identical with those of the first embodiment. In the second embodiment, the virtual player process is performed at step S72 following step S17. The virtual player process is for controlling answering of the virtual player. Hereinafter, the virtual player process is described in detail.

Figure 15:
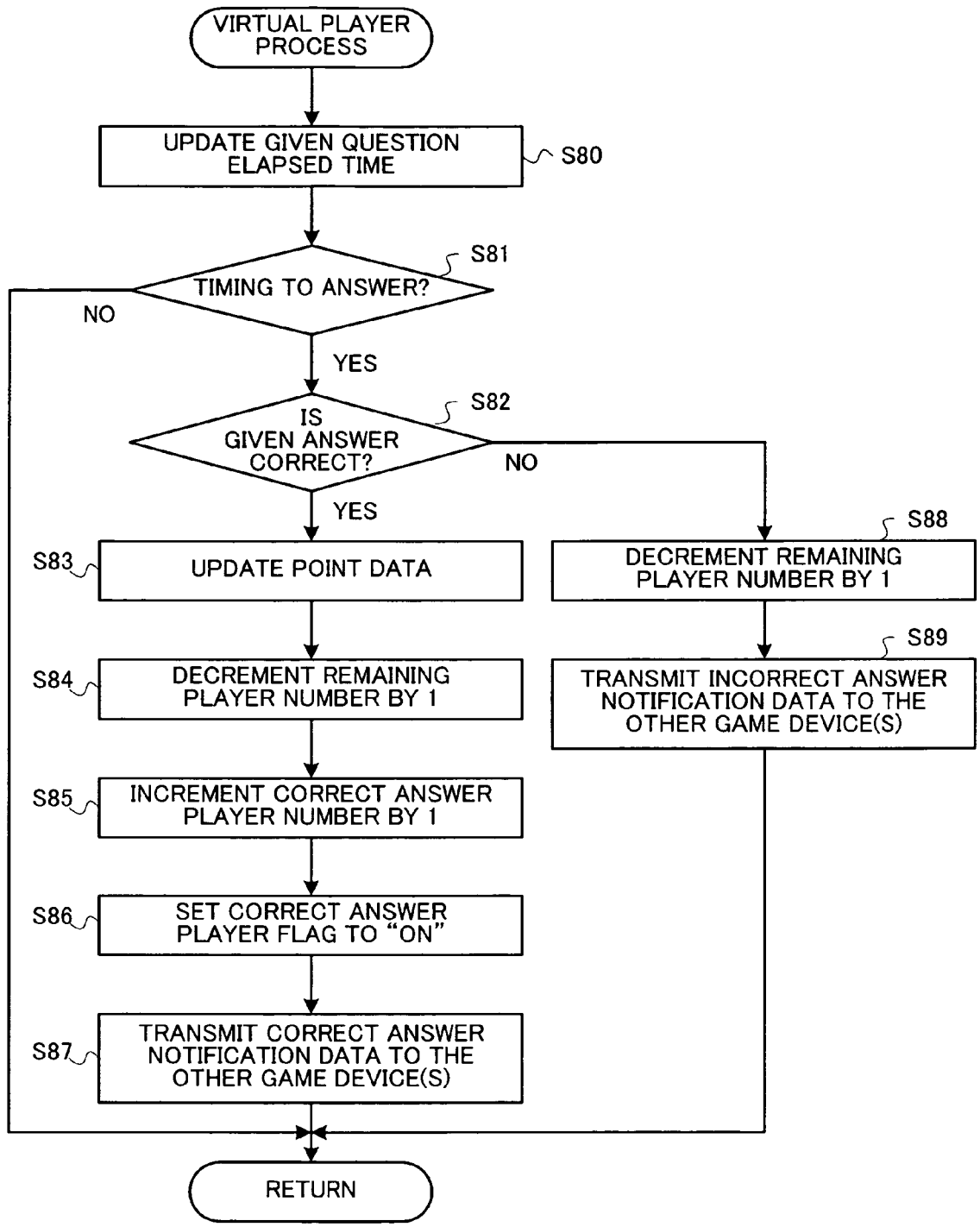
FIG. 15 is a flowchart showing in detail a sequence of processes at step S72 shown in FIG. 13.

FIG. 15 is a flowchart showing in detail a sequence of processes of the virtual player process at step S72 shown in FIG. 13. At step S80 of the virtual player process, an elapsed time measured from when a question has been given is updated. As described above, the iteration of processes at steps S13 to S21 is performed at predetermined time intervals (e.g., performed at each time frame). Accordingly, the CPU core 21 repeatedly updates the content of the given question elapsed time data 64 stored in the RAM 24 by using the number of seconds obtained as a result of adding a predetermined length of time to a current elapsed time. After step S80 has been completed, a process at step S81 is performed.

It is determined at step S81 whether or not a timing that the virtual player should give an answer has come. The timing at which the virtual player should give an answer is when the elapsed time updated at step S80 reaches the answering time set at step S73. To be specific, the CPU core 21 determines whether or not the answering time set at step S73 coincides with the elapsed time indicated by the given question elapsed time data 64. When the CPU core 21 determines that the answering time coincides with the elapsed time, the CPU core 21 then determines that the timing that the virtual player should give an answer has come, and then performs a process at step S82. When the CPU core 21 determines that the answering time does not coincide with the elapsed time, the CPU core 21 then determines that the timing that the virtual player should give an answer has not come yet, and ends the virtual player process.

It is determined at step S82 whether or not the answer having been given by the virtual player is correct. To be specific, the CPU core 21 determines whether the answer of the virtual player determined at step S74 is correct or incorrect. When it is determined at step S82 that the answer having been given by the virtual player is correct, processes at steps S83 to S87 are performed. When it is determined at step S82 that the answer of the virtual player is not correct (i.e., incorrect), processes at steps S88 and S89 are performed.

At step S83, the number of points of the virtual player is updated. The process at step S83 is same as the process at step S65 shown in FIG. 11. At step S84, the value of the remaining player number data 54 stored in the RAM 24 is decremented by 1. The process at step S84 is same as the process at step S45 shown in FIG. 9. At the following step S85, the value of the correct answer player number data 53 stored in the RAM 24 is incremented by 1. At the following step S86, the correct answer player flag is set to "ON". The process at step S85 is same as the process at step S46, and the process at step S86 is same as the process at step S47. After step S86, a process at step S87 is performed.

At step S87, the game device 10 controlling answering of the virtual player transmits the correct answer notification data to the other game device(s) 10. The correct answer notification data transmitted at step S87 contains: data indicating an ID to identify, among the plurality of players, the virtual player corresponding to the currently-performed virtual player process; and data indicating the remaining time left when the virtual player has given a correct answer. Note that, in the second embodiment, a unique ID is given in advance to each of the plurality of players including the virtual player. At step S87, the CPU core 21 transmits, as the correct answer notification data, the data indicating the ID and the remaining time data 55 to the other game device(s) 10. Note that, in another embodiment, the correct answer notification data may contain, instead of the remaining time data 55, the point data 56 of the virtual player. When the process at step S87 is completed, the CPU core 21 ends the virtual player process.

At step S88, the value of the remaining player number data 54 stored in the RAM 24 is decremented by 1. The process at step S88 is same as the process at step S84. At the following step S89, the game device 10 controlling answering of the virtual player transmits the incorrect answer notification data to the other game device(s) 10. The incorrect answer notification data transmitted at step S89 contains data indicating the ID to identify, among the plurality of players, the virtual player corresponding to the currently-performed virtual player process. In other words, the CPU core 21 transmits, to the other game device(s) 10, the data indicating the ID as the incorrect answer notification data. Since the correct answer notification data transmitted at step S87 contains the remaining time data, and the incorrect answer notification data transmitted at step S89 does not contain the remaining time data, the other game device(s) 10 can recognize whether received data is the correct answer notification data or the incorrect answer notification data. When the process at step S89 is completed, the CPU core 21 ends the virtual player process. When the virtual player process ends, the CPU core 21 performs the process at step S18. Processes performed from step S18 are same as those described in the first embodiment.

In the case where the number of virtual players is one, the processes shown in FIGS. 13 to 15 are performed only by the game device 10 which controls answering of the virtual player. The other game device(s) 10 performs the game processes described in the above first embodiment. In the case where there exist a plurality of virtual players, a plurality of game devices 10 control answering of the plurality of virtual players, respectively. Here, the plurality of game devices 10 respectively controlling answering of the plurality of virtual players perform the game processes shown in FIGS. 13 to 15, and the other game device(s) 10 performs the game processes described in the above first embodiment. Note that, in the case where there exist the plurality of virtual players, one game device 10 may control answering of the plurality of virtual players. In such a case, the game device 10 performs the virtual player process of the question giving process shown in FIG. 13 for each of the plurality of virtual players.

As an exemplary modification of the second embodiment, attributes of a manner in which any player has answered questions may be stored as history data, and the history data may be used as the player data 61. In other words, the player data 61 may be generated based on the history data of any player, the history data being collected from a previously played game. Hereinafter, as the exemplary modification of the second embodiment, game processes performed in the case where the history data is stored will be described. Note that, the history data described below contains the correct answer rate data and the answering time data.

Figure 16:
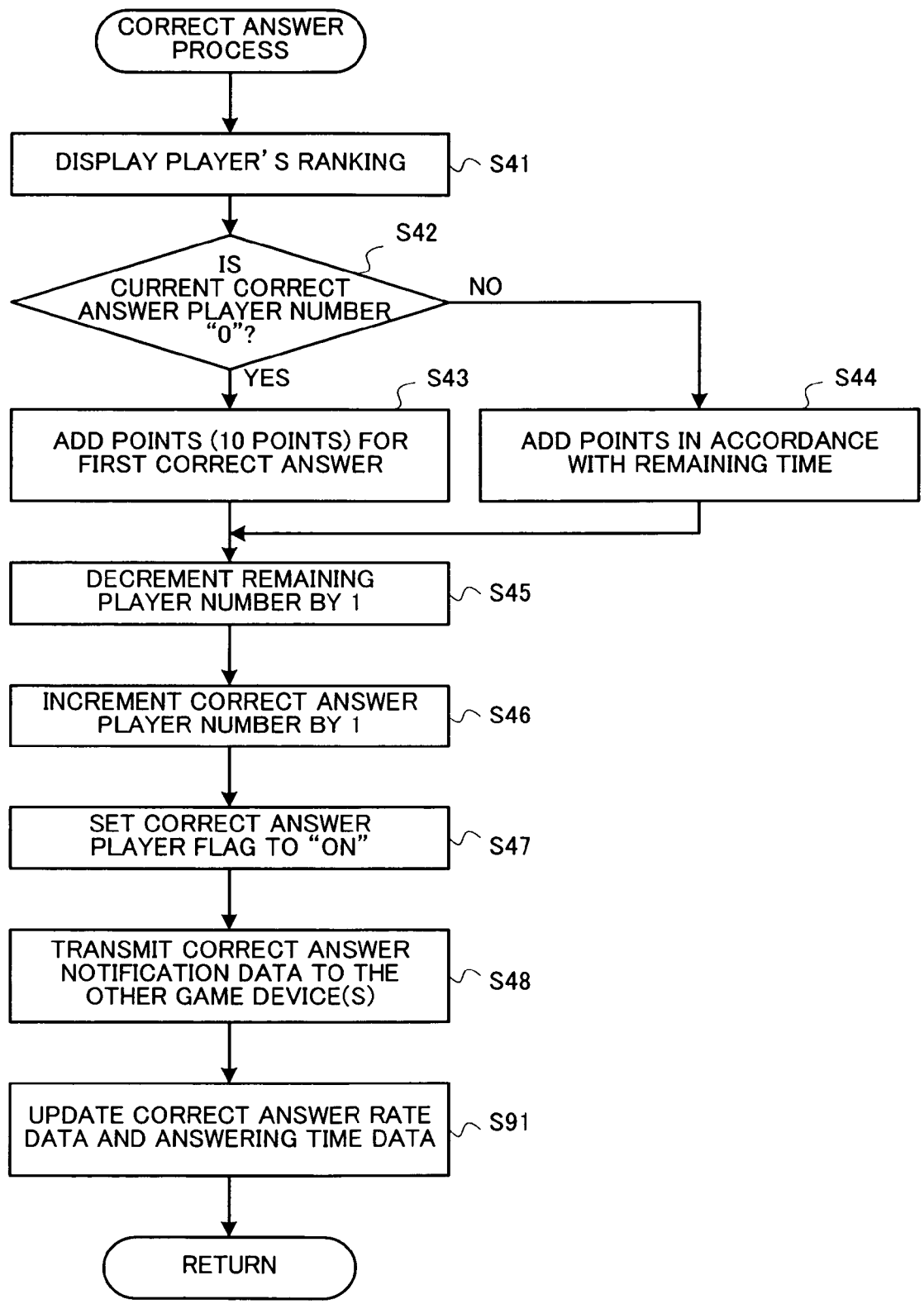
FIG. 16 is a flowchart showing a sequence of processes of a correct answer process in an exemplary modification of the second embodiment.
Figure 17:
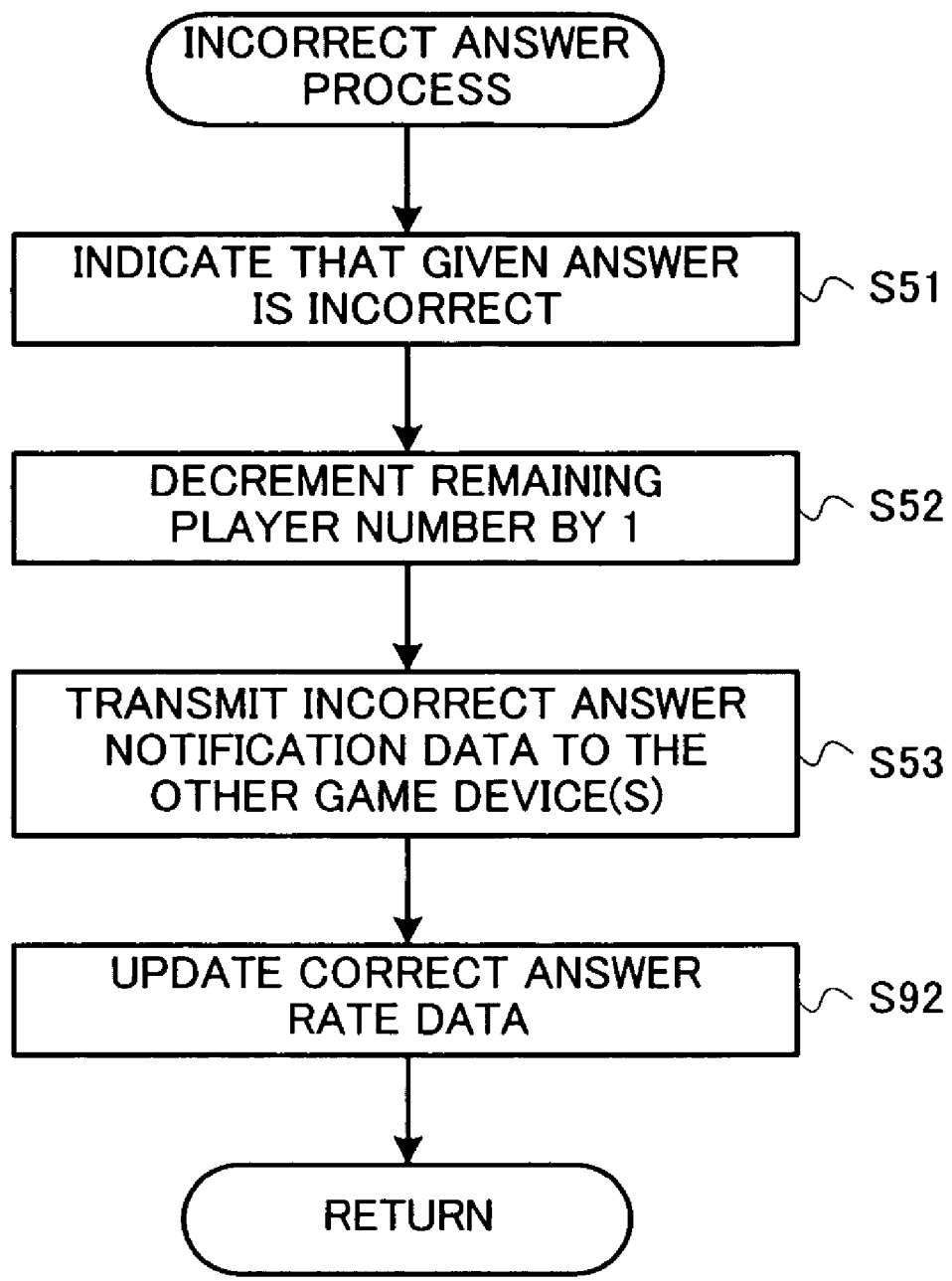
FIG. 17 is a flowchart showing a sequence of processes of an incorrect answer process in the exemplary modification of the second embodiment.

The game processes performed in the case where the history data is stored and the game processes described in the first embodiment are same except that the correct answer process and the incorrect answer process are different. FIG. 16 is a flowchart showing a sequence of processes of the correct answer process in the exemplary modification of the second embodiment. FIG. 17 is a flowchart showing a sequence of processes of the incorrect answer process in the exemplary modification of the second embodiment. In FIGS. 16 and 17, a step indicating a same process as that indicated by a step of FIG. 9 or FIG. 10 is denoted by a same step number as that used for the step of FIG. 9 or FIG. 10, and a detailed description thereof will be omitted.

In the correct answer process shown in FIG. 16, processes at steps S41 to S48 are performed first. The processes at steps S41 to S48 are same as those described in the first embodiment. In the exemplary modification of the second embodiment, a process at step S91 is performed after step S48.

At step S91, the correct answer rate data and the answering time data stored in the RAM 24 are updated. To be specific, the correct answer rate is a value obtained by dividing the number of questions answered correctly by the total number of questions of a same type and difficulty level. Here, the CPU core 21 may cause the RAM 24 to store the correct answer rate for each mini game previously played, or to store an overall correct answer rate for all previously played mini games. In the exemplary modification of the second embodiment, the answering time indicated by the answering time data is an average length of time from when a question is given until a player gives a correct answer. In another embodiment, the answering time indicated by the answering time data may be an average length of time from when a question is given until a player gives an answer (including both a correct answer and an incorrect answer). The CPU core 21 may cause the RAM 24 to store the answering time calculated for each mini game having been played, or to store the answering time calculated for overall mini games having been played. When the process at step S91 is completed, the CPU core 21 ends the correct answer process shown in FIG. 16.

In the incorrect answer process shown in FIG. 17, processes at steps S51 to S53 are performed. The processes at steps S51 to S53 are same as those described in the first embodiment. In the exemplary modification of the present embodiment, a process at step S92 is performed after step S53. To be specific, at step S92, the correct answer rate data stored in the RAM 24 is updated. In the exemplary modification of the present embodiment, since the answering time data indicates the average length of time from when a question is given until a player gives a correct answer, the answering time data is not updated at step S92. When the process at step S92 is completed, the CPU core 21 ends the incorrect answer process shown in FIG. 17.

By performing the processes at steps S91 and S92, the history data (i.e., the correct answer rate data and the answering time data) of a player is stored into the RAM 24 each time one mini game ends. If the history data is stored in the RAM 17*b* of the memory card 17, and the memory card 17 is mounted on another game device 10, said another game device 10 is enabled to use the history data as the player data. If a player acquires the history data of another player, and uses the history data as the player data, the player can play the game with the virtual player having attributes of a manner in which said another player answers questions. Further, if a server is established for distributing the history data via a network, a player is allowed to obtain various history data. This enables the player to, e.g., obtain the history data of a celebrity, and play the game with a virtual celebrity player. This makes the quiz game using the virtual player more interesting.

In the second embodiment, the game device 10 is not necessarily required to store the player data for each genre, each mini game and each difficulty level. For example, the virtual player may be set available only for a genre for which the player data has been stored, and the virtual player may be set unavailable for a genre for which the player data has not been stored. Further, if it is determined during one mini game that the majority of players playing the mini game have answered questions correctly, a difficulty level of each question may be gradually increased. In such a case, if the player data is not stored in the RAM 24 for a particular difficulty level, questions of the particular difficulty level may be set so as not to be given.

The game device 10 may display the player data of the virtual player before the start of the game. For example, the game device 10 may calculate for each genre a skill level of the virtual player based on the player data of the virtual player, and then display, on the first LCD 11 or the second LCD 12, the skill level of the virtual player for each genre.

Third Embodiment

Next, the game device 10 and the game program according to a third embodiment will be described. In the first and second embodiments, the time limit has a fixed time length. However, in the third embodiment, the length of the time limit is changed in accordance with answer result data. The answer result data indicates information about a result of an answer given by at least one player. The answer result data is, for example, data indicating the number of players each having given a correct answer to a question, and data indicating an average length of time from when a question is given until each player gives an answer. Hereinafter, the third embodiment will be described in detail.

Since the game device 10 according to the third embodiment, is same as the game device 10 shown in FIGS. 1 and 2, a detailed description thereof will be omitted. In the third embodiment, game processes performed by the game device 10 are different from those of the first embodiment. Hereinafter, the third embodiment will be described with a focus on the game processes.

Figure 18:
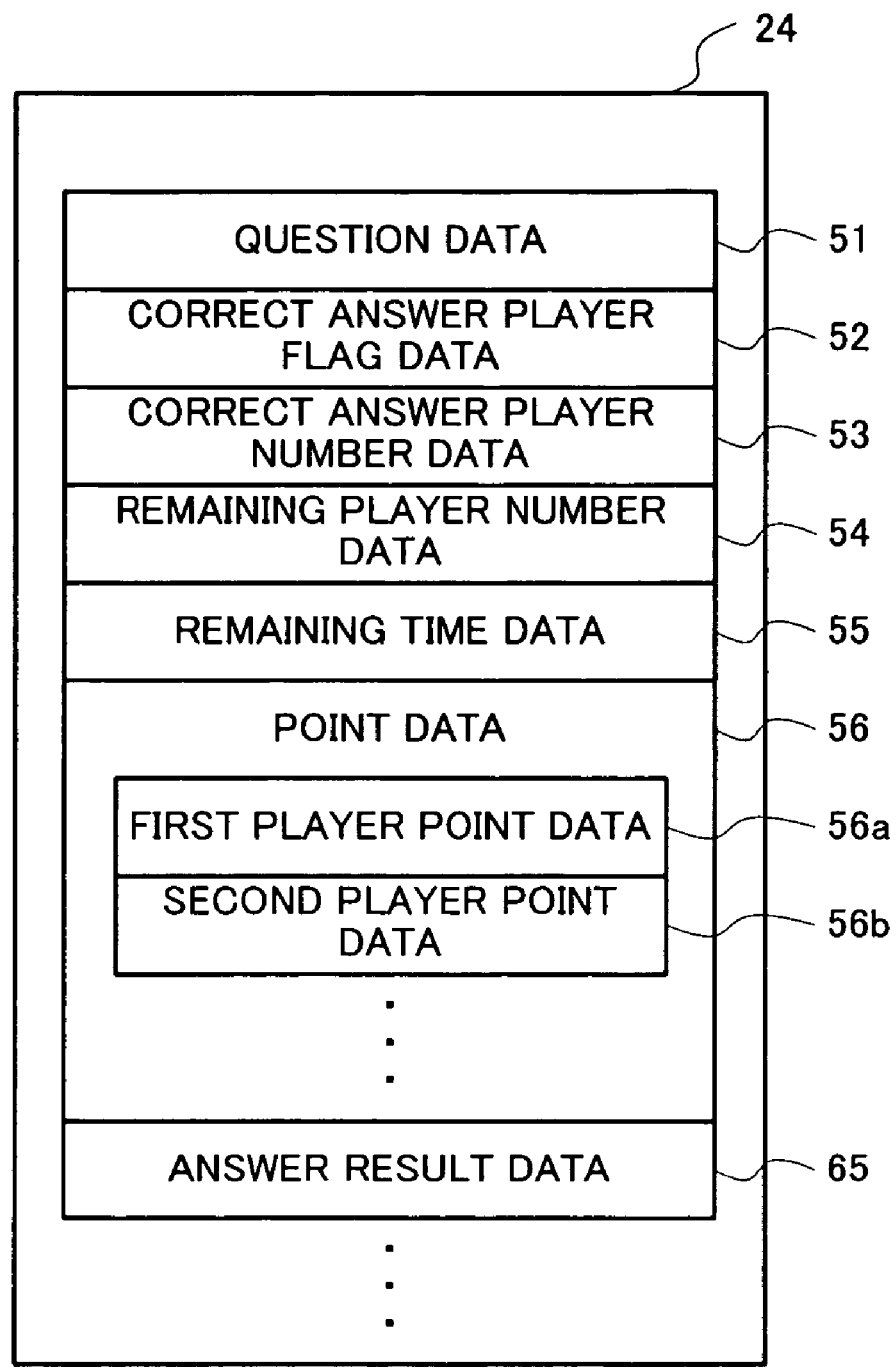
FIG. 18 shows main data used for game processes, which is stored in the RAM 24 of the game device 10 according to a third embodiment.

FIG. 18 shows main data used for the game processes, which is stored in the RAM 24 of the game device 10 according to the third embodiment. As shown in FIG. 18, the RAM 24 stores, in addition to the data shown in FIG. 5, answer result data 65. In FIG. 18, data which is identical with the data shown in FIG. 5 is denoted by a same reference numeral as that used for the data shown in FIG. 5, and a detailed description thereof will be omitted.

The answer result data 65 indicates information about a result of an answer given by at least one player. The information is, for example, the number of players each having given a correct answer to a previous question, the number of players each having given an answer to the previous question within a time limit, and an average length of time from when a question is given until each player gives an answer. In the third embodiment, data indicating the number of players each having given a correct answer to a question is stored in the RAM 24 as the answer result data.

Next, the game processes of the third embodiment will be described in detail with reference to FIG. 19. Similarly to the first embodiment, the processes of the third embodiment are performed in accordance with the flowchart shown in FIG. 6. Here, the question giving process of the third embodiment is partly different from that of the first embodiment. Hereinafter, the question giving process of the third embodiment will be described in detail.

Figure 19:
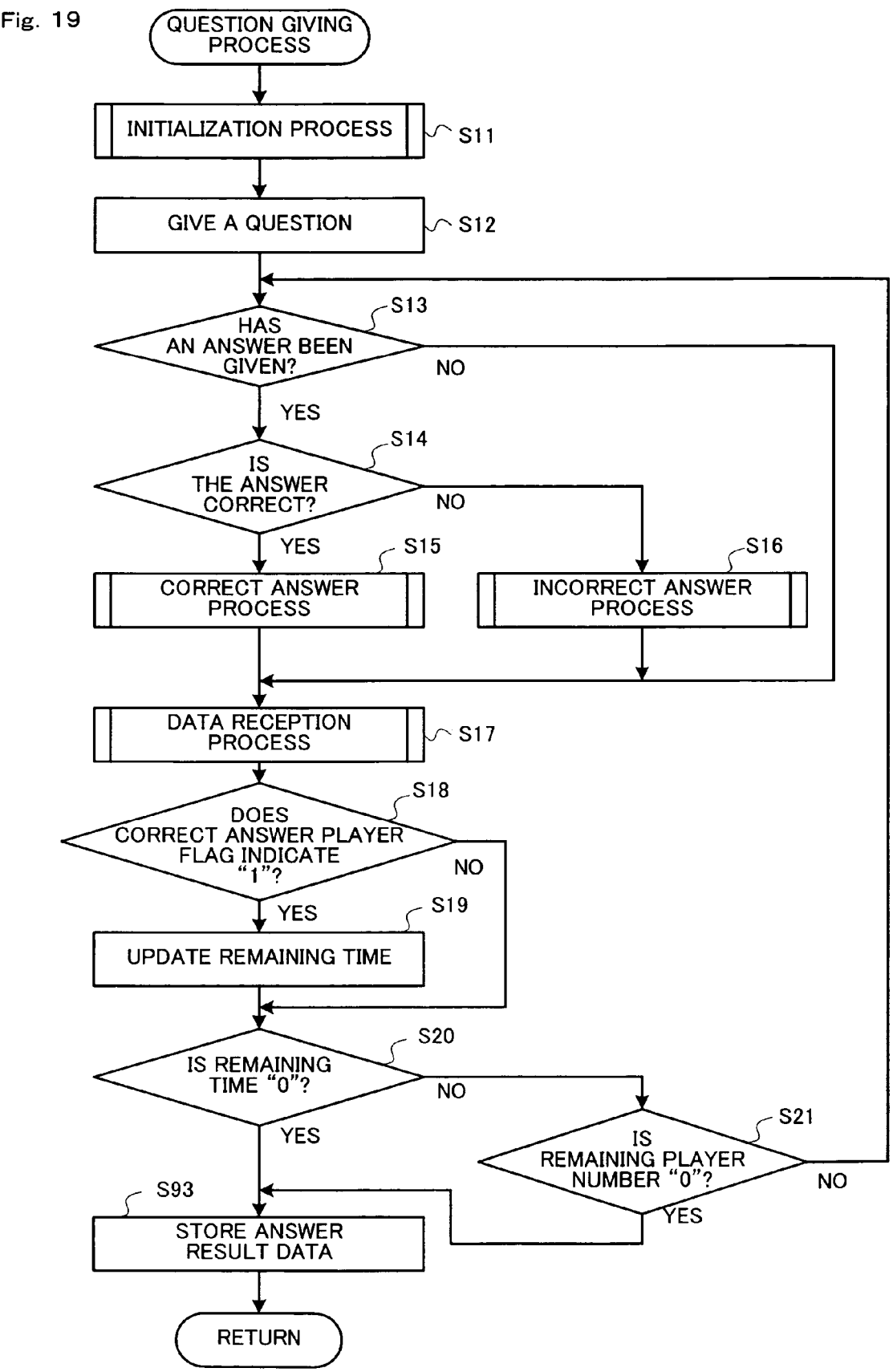
FIG. 19 is a flowchart showing in detail the question giving process of the third embodiment.

FIG. 19 is a flowchart showing in detail the question giving process of the third embodiment. In FIG. 19, a step indicating a same process as that indicated by a step of FIG. 7 is denoted by a same step number as that used for the step of FIG. 7, and a detailed description thereof will be omitted. In the question giving process shown in FIG. 19, processes at steps S11 to S21 which are identical with the processes at steps S11 to S21 of the first embodiment are performed. In the third embodiment, when a determination result at step S20 is positive (i.e., "Yes" at step S20), or a determination result at step S21 is positive (i.e., "Yes" at step S21), a process at step S93 is performed.

At step S93, the answer result data is updated, and then stored in the RAM 24. Here, the answer result data is the correct answer player number data 53 indicating the number of players each having given a correct answer to a question which has already been given in the currently-performed question giving process. Accordingly, the CPU core 21 causes the RAM 24 to store, as the answer result data 65, the correct answer player number data 53 stored in the RAM 24. After the process at step S93 is completed, the CPU core 21 ends the question giving process.

In the third embodiment, a process at step S31 of the initialization process is different from that of the first embodiment. At step S31, the CPU core 21 determines a time limit (i.e. a time length to be set as the remaining time data 55) based on a content of the answer result data 65. At this point, the answer result data 65 indicates the number of players each having given a correct answer to a previous question. In other words, the length of the time limit is determined based on the number of players each having given a correct answer to the previous question. The length of the time limit is determined such that the length of the time limit becomes longer as the number of players each having given a correct answer indicated by the answer result data 65 becomes smaller. The small number of players each having given a correct answer indicates that not many players have answered the question correctly, and a difficulty level of a next question is required to be lowered by lengthening the time limit. For example, if the number of players each having given a correct answer indicated by the answer result data 65 is equal to or smaller than a predetermined number, the time limit may be set to 10 seconds, and if the number of players each having given a correct answer is greater than the predetermined number, the time limit may be set to 5 seconds. Note that, similarly to the first embodiment, at step S31 of the third embodiment, the value of the correct answer player number data 53 stored in the RAM 24 is reset. To be specific, the CPU core 21 updates, by using a value of "0", the correct answer player number data 53, and then stores the correct answer player number data 53 in the RAM 24.

As described above, according to the third embodiment, since the length of the time limit is determined based on the results of answers given by the players to the previous question, the length of the time limit is set appropriately. In the third embodiment, data indicating the results of answers to the previous question is used as the answer result data. However, data indicating the results of answers to a plurality of previous questions may be used as the answer result data. For example, data indicating a number obtained by averaging, with respect to questions having already been given during a currently-played mini game, numbers of players each having given a correct answer may be used as the answer result data.

Fourth Embodiment

Next, the game device 10 and the game program according to a fourth embodiment will be described. In the above first to third embodiments, the time limit is not set until any player gives a correct answer. In the fourth embodiment, the time limit is set when any player gives a correct answer, or when a predetermined length of time has passed after a question is given. In other words, the time limit is set when the predetermined length of time has passed after a question is given even if no player has given a correct answer at that point. Hereinafter, a fourth embodiment will be described in detail.

Since the game device 10 according to the fourth embodiment is same as the game device 10 shown in FIGS. 1 and 2, a detailed description thereof will be omitted. In the fourth embodiment, game processes performed by the game device 10 are different from those of the first embodiment. Hereinafter, the fourth embodiment will be described with a focus on the game processes.

In the fourth embodiment, the RAM 24 stores the given question elapsed time data 64 (refer to FIG. 12). In the initialization process at step S11, the given question elapsed time is reset. This is same as the process at step S75 shown in FIG. 14.

Figure 20:
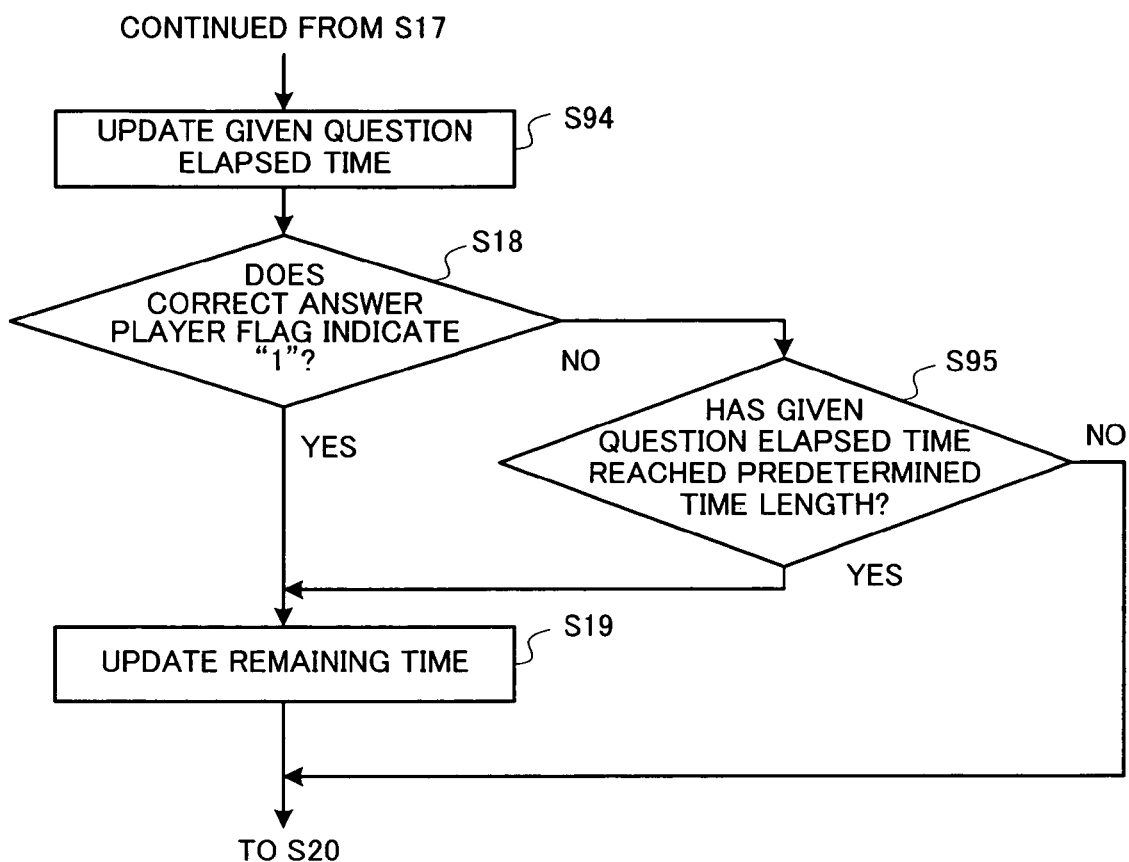
FIG. 20 is a flowchart showing a part of the question giving process of a fourth embodiment.

FIG. 20 is a flowchart showing a part of the question giving process of the fourth embodiment. In FIG. 20, a step indicating a same process as that indicated by a step of FIG. 7 is denoted by a same step number as that used for the step of FIG. 7, and a detailed description thereof will be omitted. In FIG. 20, only the part of the question giving process is shown. In the part of the question giving process shown in FIG. 20, at step S94 following step S17, the given question elapsed time data 64 is updated. The process at step S94 is same as the process at step S80 shown in FIG. 15. After step S94, a process same as the process at step S18 of the first embodiment is performed.

In the fourth embodiment, when a determination result at step S18 is negative, a process at step S95 is performed. To be specific, it is determined at step S95 whether the length of elapsed time from when a question is given has reached the predetermined length of time. In other words, it is determined at step S95 whether the predetermined length of time has passed after the question is given. When it is determined at step S95 that the length of elapsed time has reached the predetermined length of time, the process at step S19 is performed. To be specific, the remaining time is updated at step S19. When it is determined at step S95 that the length of elapsed time has not reached the predetermined length of time yet, the process at step S19 is skipped, and the process at step S20 is performed. Processes performed from step S20 are same as those of the first embodiment.

As described above, in the fourth embodiment, when the predetermined length of time has passed after a question is given, the time limit is set and the countdown of the remaining time starts even if no player has given a correct answer at that point. This allows a question to end in a particular time when the question is too difficult and no player can answer the question. If an unlimited length of time is given to the players to answer a question which is too difficult, the players become tired of figuring out a correct answer. This may cause the players to feel that the quiz game is boring. However, according to the fourth embodiment, a question ends after a particular period of time has passed, thereby keeping the players from becoming bored. Note that, it is preferred that the above-described predetermined length of time is set to be longer than the length of the time limit. For example, it is preferred that the predetermined length of time is set to be approximately 1 minute in the case where the time limit is 5 seconds. The predetermined length of time should be set such that the players are kept from being tired of thinking, and also that the players are given enough time to figure out a correct answer.

As described above, according to the first to fourth embodiments, the time limit is set when any of the plurality of players gives a first correct answer, and then the countdown of the remaining time starts. Since the time limit is set when any player gives a first correct answer, the length of the time limit is kept from being too long or too short. In other words, the length of the time limit is set appropriately.

The first to fourth embodiments are described by taking the example in which the plurality of players use the plurality of game devices, respectively. However, the number of game devices may be one. In the case where the number of game devices is one, some of the above-described game processes, which involve data transmission between each game device, are not required to be performed. For instance, the present invention may be realized by one game device to which a plurality of controllers are connected. In such a case, each player uses one of the controllers to input an answer. In the case where an input device having many keys such as a keyboard is used, the number of input devices may be one since a plurality of players can share the input device.

In the first to fourth embodiments, the time limit is set when any of the plurality of players has given a first correct answer. However, a timing of setting the time limit is not limited thereto. The timing of setting the time limit may be when the number of players each having given a correct answer reaches a predetermined number. For example, in the case where the number of players is 10, the time limit may be set when the number of players each having given a correct answer becomes 3. Alternatively, the time limit may be set when any of the plurality of players gives an answer regardless whether the answer is correct or not.

Although descriptions are given in the above first to fourth embodiments by taking the quiz game as an example, the example embodiment is applicable not only to a quiz game but also to any other game in which a plurality of players are given predetermined tasks. The tasks may be given to the players in the form of a simple action game or a shooting game other than the above-described quiz game. The tasks may require each player to perform predetermined inputs using a touch panel. For instance, each game device may display a plurality of dots on the screen, and require a corresponding player to perform an input to draw continuous lines connecting all the dots.

In the case where the present invention is applied to a game in which predetermined tasks are given to a plurality of players, each game device counts the number of players each having completed the given tasks, and sets the time limit when the counted number of players reaches a predetermined number. Then, each game device measures an elapsed time from when the time limit is set. When the elapsed time reaches the time limit, each game device stops accepting from a corresponding player an input to perform the tasks.

In the above case, similarly to the quiz game of the above embodiments, the virtual player whose answering is controlled by the game device 10 may be included among the plurality of players. Moreover, the game device 10 may store, as history data, a history of tasks performed by any player, and controls the virtual player such that the virtual player performs the tasks in accordance with the history data. Further, the game device 10 may store, as information indicating a performance result, e.g., information indicating the number of players each having completed the tasks within the time limit and/or information indicating a time consumed until each player has completed the tasks. Then, the game device 10 may change the time limit in accordance with the information indicating the performance result. Further, the game device 10 may measure an elapsed time from when the tasks are given (i.e., given task elapse time), and set the time limit when the number of players each having completed the tasks has reached a predetermined number, or when the given task elapse time has reached a predetermined length of time.

The present invention having an objective of, e.g., setting an appropriate time limit, is applicable to a game in which, e.g., a plurality of players perform predetermined tasks, or a plurality of players answer predetermined questions.

While the present invention has been described in detail, the foregoing description is in all aspects illustrative and not restrictive. It is understood that numerous other modifications and variations can be devised without departing from the scope of the invention.

What is claimed is:

1. A non-transitory storage medium for storing a game program causing a computer of a game device to execute a quiz game in which a plurality of players participate, the game program causing the computer to perform:
   providing a question to the plurality of players;
   player number counting for counting a number of players each having provided an answer to the question or each having provided a correct answer to the question; and
   terminating an acceptance of an answer when an elapsed time has reached a predetermined time limit, said elapsed time starting when the counted number of players reaches a predetermined number of players greater than zero.

2. The storage medium according to claim 1, wherein the game program further causes the computer to perform:
   remaining time obtaining, for a player having provided a correct answer to the question after a start of measuring the elapsed time, a remaining time by subtracting the elapsed time from the predetermined time limit, the elapsed time having been measured until the player has provided the correct answer, and
   adding a predetermined number of points to a number of points of a player who has provided, before the start of measuring the elapsed time, a correct answer to the question, and, based on the remaining time, adding a number of points, which is less than the predetermined number of points, to a number of points of the player having provided the correct answer after the start of measuring the elapsed time.

3. The storage medium according to claim 1, wherein the game program further causes the computer to perform:
   calculating an order in which the players each have provided a correct answer to the question; and
   in accordance with the order, adding a number of points to each of numbers of points of the players each having provided the correct answer.

4. The storage medium according to claim 1, wherein
   the game program further causes the computer to perform answer result storing of, after the acceptance of an answer is terminated at the terminating an acceptance of an answer when the elapsed time has reached the time limit, answer result data indicating information about a result of an answer provided by at least one of the plurality of players,
   after the acceptance of an answer is terminated at the terminating an acceptance of an answer when the elapsed time has reached the time limit, a next question is provided by performing the providing a question to the plurality of players again, and
   a length of a time limit for the next question is set based on a content of the answer result data.

5. The storage medium according to claim 1, wherein
   a virtual player whose answering is controlled by the computer is included among the plurality of players,
   the game program further causes the computer to perform:
   player data obtaining for, before the question is provided, obtaining player data indicating an attribute of a manner in which the virtual player answers the question; and
   a control for controlling answering of the virtual player in accordance with the attribute indicated by the player data.

6. The storage medium according to claim 4, wherein
   the answer result data contains data indicating at least either information about the number of players each having provided a correct answer to the question or information about a length of time from when the question is provided until each of the plurality of players has provided an answer to the question.

7. The storage medium according to claim 5, wherein
   the player data contains correct answer rate data indicating a correct answer rate of the virtual player for the question, and answering time data indicating a length of time from when the question is provided until the virtual player provides an answer, and
   at the control, whether the answer to be provided by the virtual player is correct is determined in accordance with the correct answer rate data, and a length of time from when the question is provided until the virtual player provides the answer is determined in accordance with the answering time data.

8. The storage medium according to claim 5, wherein
   the game program further causes the computer to perform history recording for recording history data indicating a history of results of answers provided by at least one of the plurality of players, and
   at the control, the history data previously recorded at the history recording is used as the player data.

9. The storage medium according to claim 8, wherein
   at the history recording, at least correct answer rate data indicating a correct answer rate of the at least one player and answering time data indicating a length of time from when a question is provided until the at least one player provides an answer are recorded as the history data.

10. A non-transitory storage medium for storing a game program causing a computer of a game device to execute a quiz game in which a plurality of players participate, the game program causing the computer to perform:
    providing a question to the plurality of players;
    first time measuring for measuring a first elapsed time which is an elapsed time from when the question has been provided;
    player number counting for counting a number of players each having provided an answer to the question or each having provided a correct answer to the question; and
    terminating an acceptance of an answer at the earlier of when (i) the first elapsed time reaches predetermined first time limit, and (ii) a second elapsed time reaches a predetermined second time limit, said second elapsed time starting when the counted number of players reaches a predetermined number of players greater than zero.

11. The storage medium according to claim 10, wherein the game program further causes the computer to perform:
    remaining time obtaining, for a player having provided a correct answer to the question after a start of measuring the second elapsed time, a remaining time by subtracting the second elapsed time from the second time limit, the second elapsed time having been measured until the player has provided the correct answer, and
    adding a predetermined number of points to a number of points of a player who has provided, before the start of measuring the second elapsed time, a correct answer to the question, and, based on the remaining time, adding a number of points, which is less than the predetermined number of points, to a number of points of the player having provided the correct answer after the start of measuring the second elapsed time.

12. The storage medium according to claim 10, wherein the game program further causes the computer to perform:
calculating an order in which the players each have provided a correct answer to the question; and
in accordance with the order, adding a number of points to each of numbers of points of the players each having provided the correct answer.

13. The storage medium according to claim 10, wherein the game program further causes the computer to perform answer result storing of, after the acceptance of an answer is terminated at the terminating an acceptance of an answer when the second elapsed time has reached the second time limit, storing answer result data indicating information about a result of an answer provided by at least one of the plurality of players,
after the acceptance of an answer is terminated at the terminating an acceptance of an answer when the second elapsed time has reached the second time limit, a next question is provided by performing the providing a question to the plurality of players again, and
a length of the second time limit for the next question is set based on a content of the answer result data.

14. The storage medium according to claim 13, wherein the answer result data contains data indicating at least either information about the number of players each having provided a correct answer to the question or information about a length of time from when the question is provided until each of the plurality of players has provided an answer to the question.

15. The storage medium according to claim 10, wherein a virtual player whose answering is controlled by the computer is included among the plurality of players,
the game program further causes the computer to perform:
player data obtaining for, before the question is provided, obtaining player data indicating an attribute of a manner in which the virtual player answers the question; and
a control for controlling answering of the virtual player in accordance with the attribute indicated by the player data.

16. The storage medium according to claim 15, wherein the player data contains correct answer rate data indicating a correct answer rate of the virtual player for the question, and answering time data indicating a length of time from when the question is provided until the virtual player provides an answer, and
at the control, whether the answer to be provided by the virtual player is correct is determined in accordance with the correct answer rate data, and a length of time from when the question is provided until the virtual player provides the answer is determined in accordance with the answering time data.

17. The storage medium according to claim 15, wherein the game program further causes the computer to perform history recording for recording history data indicating a history of results of answers provided by at least one of the plurality of players, and
at the control, the history data previously recorded at the history recording is used as the player data.

18. The storage medium according to claim 17, wherein at the history recording, at least correct answer rate data indicating a correct answer rate of the at least one player and answering time data indicating a length of time from when a question is provided until the at least one player provides an answer are recorded as the history data.

19. A game device executing a quiz game in which a plurality of players participate, the game device comprising:
question providing programmed logic circuitry for providing a question to the plurality of players;
player number counting programmed logic circuitry for counting a number of players each having provided an answer to the question or each having provided a correct answer to the question; and
terminating programmed logic circuitry for terminating an acceptance of an answer when an elapsed time has reached the time limit, wherein the elapse time starts when the counted number of players reaches a predetermined number of players greater than zero.

20. A game device executing a quiz game in which a plurality of players participate, the game device comprising:
question providing programmed logic circuitry for providing a question to the plurality of players;
first time measuring programmed logic circuitry for measuring a first elapsed time which is an elapsed time from when the question has been provided;
player number counting programmed logic circuitry for counting a number of players each having provided an answer to the question or each having provided a correct answer to the question; and
terminating programmed logic circuitry for terminating an acceptance of an answer at the earlier of when (i) the first elapsed time reaches a predetermined first time limit, and (ii) a second elapsed time reaches a predetermined second time limit, wherein the second time limit starts when the counted number of players reaches a predetermined number of players greater than zero.

21. A non-transitory storage medium for storing a game program causing a computer of a game device to execute a quiz game in which a plurality of players participate, the game program causing the computer to perform:
providing simultaneously a question to the plurality of players;
counting players providing answers to the question or providing correct answers to the question, wherein each player is counted when the player provides an answer or a correct answer;
when the count of players reaches a predetermined number greater than zero, starting a predetermined time period during which further answers may be provided from other players;
denying answers submitted after the predetermined time period has elapsed, and
generating a score for each of one or more players based on whether the player provided a correct answer during the predetermined time period.

22. A method for executing a quiz game using a game device, the method comprising the game device performing the steps of:
providing a question issued to a plurality of players of the quiz game;
sequentially accepting answers from the players who answer the question or correctly answer the question;
counting the players as they provide accepted answers, and
terminating the sequential acceptance of answers from the players when an elapsed time has reached a predetermined time limit, said elapsed time starting when the counted number of players reaches a predetermined number of players greater than zero.

23. A method for playing a quiz game using a game device, the method comprising the game device performing the steps of:
- simultaneously providing a question to a plurality of players of the quiz game;
- measuring a first elapsed time starting when the question is provided to the players;
- counting the players as each player provides an accepted answer to the question, and
- stop accepting answers from players who have not been counted at the earlier of when: (i) the first elapsed time reaches a predetermined first time limit, and (ii) a second elapsed time reaches a predetermined second time limit, said second elapsed time starting when the count of players providing accepted answers reaches a predetermined number of players greater than zero.

24. A game device apparatus having a non-transitory storage medium storing a game program and a computer, the game program is executed by the computer to cause the game device to:
- provide a question simultaneously to a plurality of players;
- count players from the plurality of players the players as each player provides answers to the question or provide correct answers to the question;
- when the count of players reaches a predetermined number greater than zero, start a predetermined time period during which further answers may be provided from players of the plurality of players who were not counted before the predetermined time period started;
- refuse to accept answers submitted from players of the plurality of players after the predetermined time period has elapsed, and
- generate a score for each of the plurality players based on whether the player provided a correct and accepted answer.

25. A method to play a quiz game using a game device, the method comprising the game program performing the steps of:
- provide a question simultaneously to a plurality of players;
- count players from the plurality of players the players as each player provides answers to the question or provide correct answers to the question;
- when the count of players reaches a predetermined number greater than zero, start a predetermined time period during which further answers may be provided from players of the plurality of players who were not counted before the predetermined time period started;
- refuse to accept answers submitted from players of the plurality of players after the predetermined time period has elapsed, and
- generate a score for each of the plurality players based on whether the player provided a correct and accepted answer.

* * * * *